United States Patent [19]
Payne et al.

[11] 3,961,365
[45] June 1, 1976

[54] COLOR DISPLAY DEVICE

[75] Inventors: Robert A. Payne, Des Plaines; Gregory E. Slobodzian, Chicago, both of Ill.

[73] Assignee: Stewart-Warner Corporation, Chicago, Ill.

[22] Filed: Oct. 24, 1974

[21] Appl. No.: 517,520

[52] U.S. Cl................................. 358/56; 358/59; 178/7.3 D; 340/334; 340/335
[51] Int. Cl.².......................................... H04N 9/30
[58] Field of Search.................... 358/59, 13, 56; 178/7.3 D; 340/334, 335

[56] References Cited
UNITED STATES PATENTS

| | | |
|---|---|---|
| 3,761,617 | 9/1973 | Tsachiya........................ 178/7.3 D |
| 3,786,474 | 1/1974 | Miller............................. 340/324 M |
| 3,843,959 | 10/1974 | Owaki et al......................... 358/59 |

*Primary Examiner*—Benedict V. Safourek
*Assistant Examiner*—Edward L. Coles
*Attorney, Agent, or Firm*—McDougall, Hersh & Scott

[57] ABSTRACT

A large display system capable of displaying a color video image receives video signals, quantizes those signals to produce a digital code capable of representing variations in the light content of the image and processes the digital code so as to control individual display devices on a large matrix of such devices to have different levels of visibility to thereby reproduce the video image for viewing by a large audience. A data processor is optionally utilized to store the digital representation of the video image in memory so that on line or off line presentations can be made.

19 Claims, 22 Drawing Figures

RED CHANNEL
SAMPLE AØ INPUT FROM MEMORY REGISTERS
| MSB | 1 | 0 | 1 | 1 | 1 | 0 | 0 | 0 | 0 | 0 | 0 | 1 |
|---|---|---|---|---|---|---|---|---|---|---|---|---|
| B2 | 0 | 1 | 0 | 1 | 1 | 0 | 0 | 0 | 1 | 1 | 0 | 1 |
| LSB | 1 | 0 | 0 | 1 | 0 | 0 | 1 | 0 | 1 | 1 | 0 | 1 |
|←――――――― 12 BIT WORD ―――――――→|
| LEVEL CONTROL VALUE | OUTPUT FROM LAMP LEVEL DECODER ||||||||||||  BULB INTENSITY |
|---|---|---|---|---|---|---|---|---|---|---|---|---|---|
| 111 | 0 | 0 | 0 | 1 | 0 | 0 | 0 | 0 | 0 | 0 | 0 | 1 | FULL ON |
| 110 | 0 | 0 | 0 | 0 | 1 | 0 | 0 | 0 | 0 | 0 | 0 | 0 | LEVEL 1 |
| 101 | 1 | 0 | 0 | 0 | 0 | 0 | 0 | 0 | 0 | 0 | 0 | 0 | LEVEL 2 |
| 100 | 0 | 0 | 1 | 0 | 0 | 0 | 0 | 0 | 0 | 0 | 0 | 0 | LEVEL 3 |
| 011 | 0 | 0 | 0 | 0 | 0 | 0 | 0 | 0 | 1 | 1 | 0 | 0 | LEVEL 4 |
| 010 | 0 | 1 | 0 | 0 | 0 | 0 | 0 | 0 | 0 | 0 | 0 | 0 | LEVEL 5 |
| 001 | 0 | 0 | 0 | 0 | 0 | 0 | 1 | 0 | 0 | 0 | 0 | 0 | LEVEL 6 |
| 000 | 0 | 0 | 0 | 0 | 0 | 1 | 0 | 1 | 0 | 0 | 1 | 0 | OFF |
| RED BULB # | 1 | 2 | 3 | 4 | 5 | 6 | 7 | 8 | 9 | 10 | 11 | 12 | |
FIG.11A
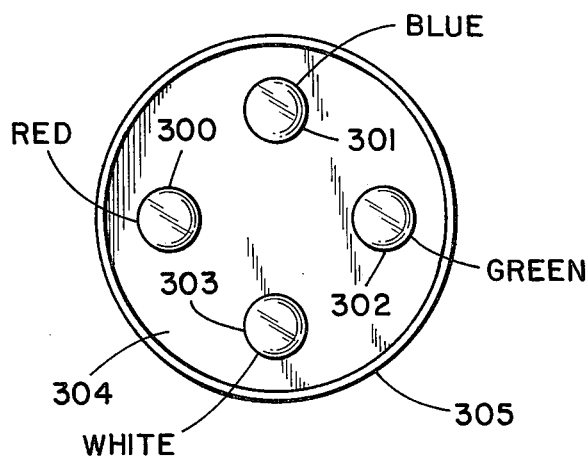
FIG.4
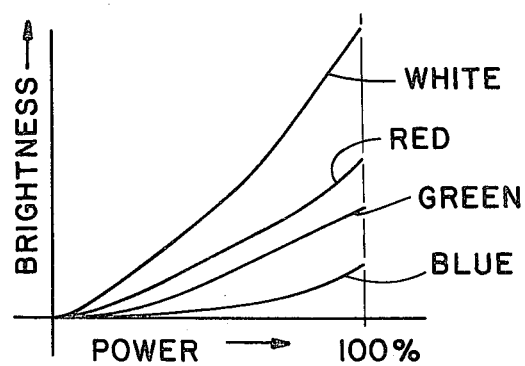
FIG.17

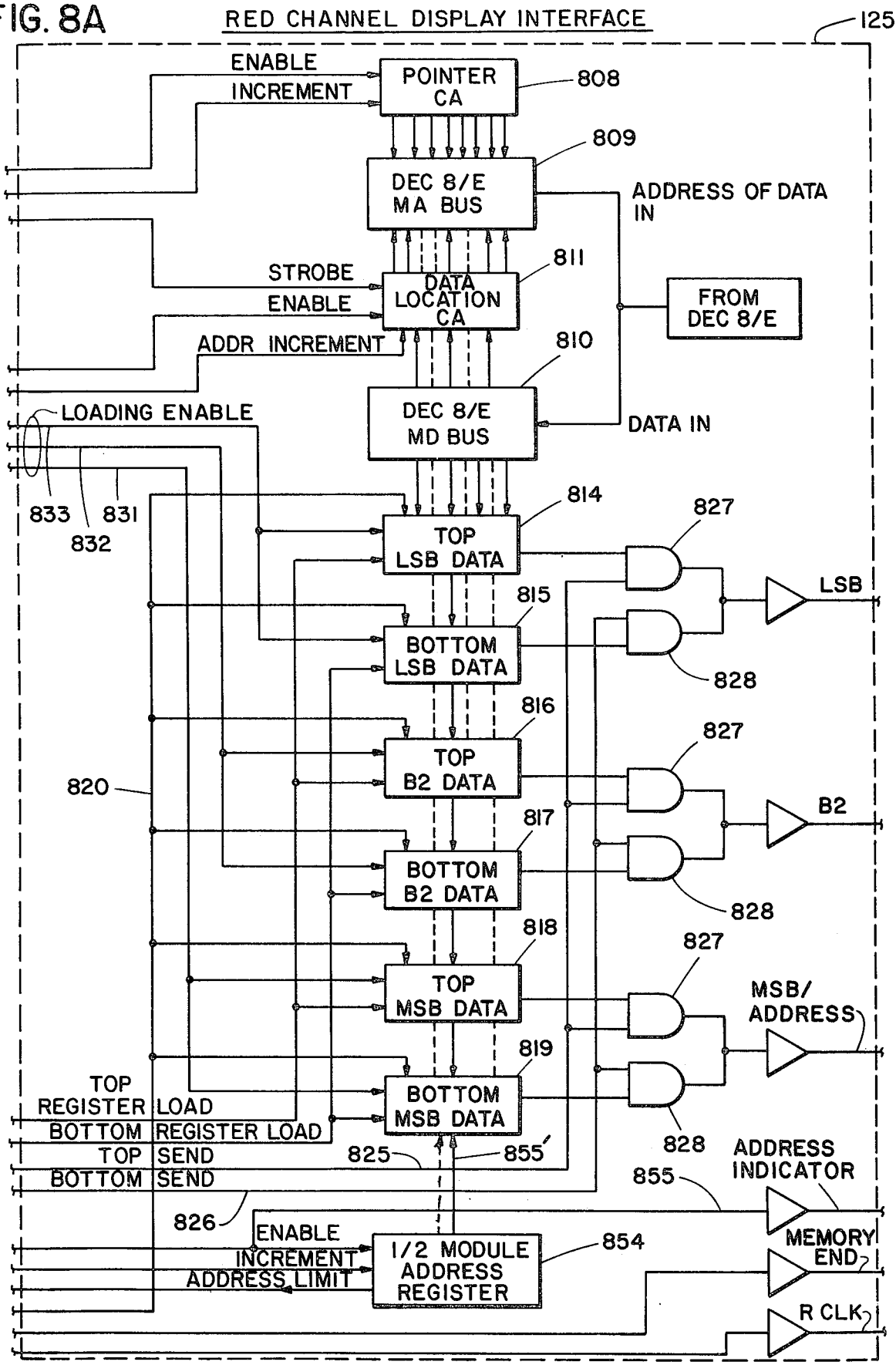
FIG. 8A  RED CHANNEL DISPLAY INTERFACE

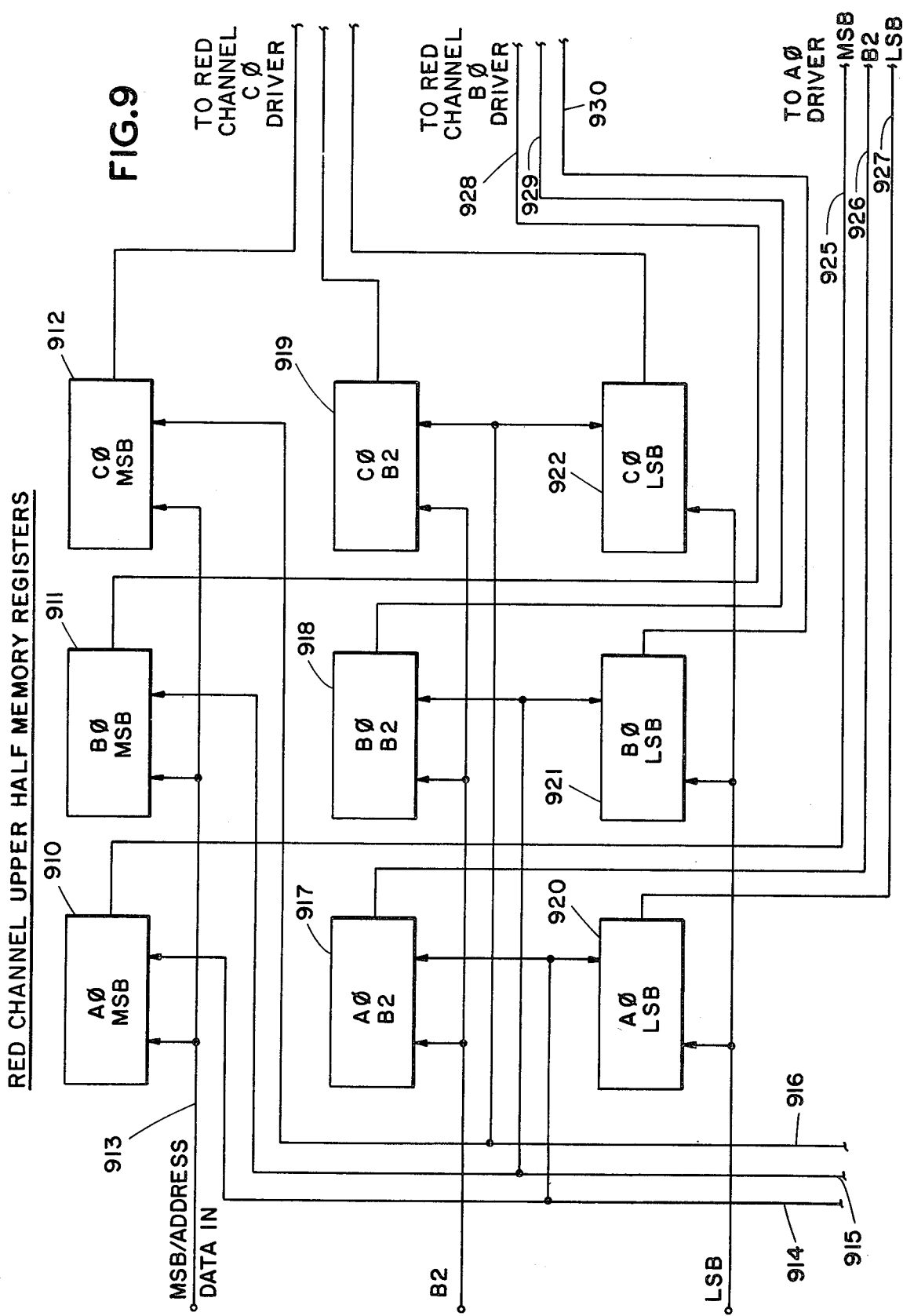

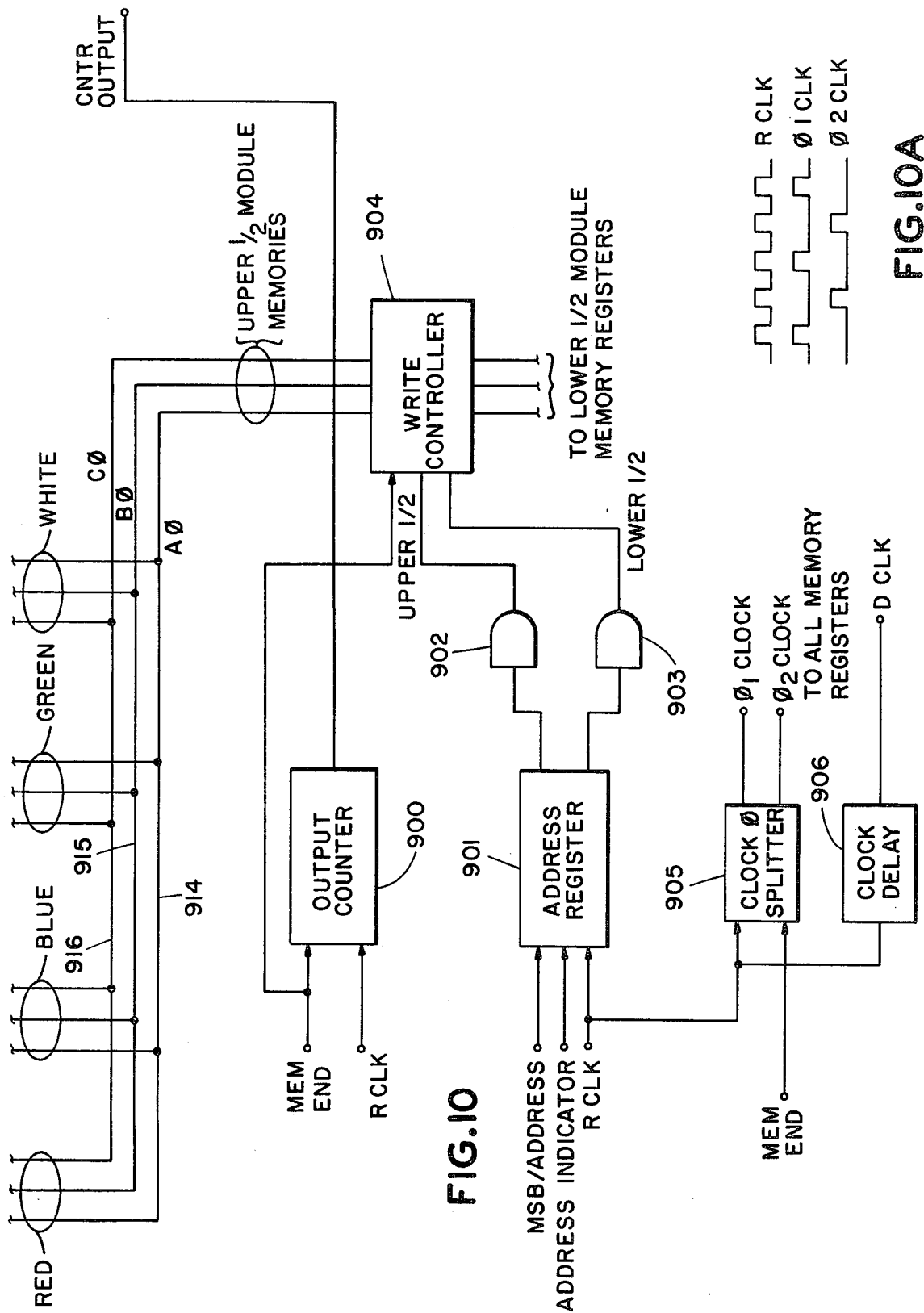

COLOR DISPLAY DEVICE

BACKGROUND OF THE INVENTION

This invention relates generally to systems for displaying pictorial representations to large numbers of people. More specifically, it relates to display systems capable of information from any one or more of a number of different sources and presenting the data in the form of alpha numerical information or pictorial representation.

In recent years there has been an ever-increasing interest in means for displaying or exhibiting to large audiences information about or pictorial representations of different events. For instance, there has developed a desire for "scoreboards" in athletic stadia to present to the audience information about the game in progress, information about games in progress elsewhere and miscellaneous information about player performance, statistics and the like. The scoreboards having such capability are, of course, well known and in relatively common use around the country. However, it is believed that when such scoreboards are provided with the additional capability of producing moving pictorial representations, their utility is considerably enhanced. Even more than this, the ability of such a scoreboard to present to a large audience an "instant replay" of events in the game in progress, they serve a further purpose which the owners and operators of stadia athletic teams and advertisers find desirable.

In addition, the presence of a display device having the capabilities indicated above, affords the opportunity to present to large audiences a wide variety of graphic and pictorial material. For instance, it becomes possible to display animated cartoons of either a humorous or advertising nature. It also becomes possible to display pictorial information from the memory of large scale digital data processors.

It is believed that a scoreboard of the type suggested to be truly satisfactory, however, must be able to present pictorial displays in other than mere black and white. Otherwise, the delineation is not completely satisfactory and the image quality is not acceptable to most viewing audiences.

Therefore, this invention provides a color display system wherein the image being displayed is not merely a two tone image. Color intensity is regulated by varying the illumination level to produce gradations going from off to full on for each color source.

Thus, it is an object of this invention to provide a novel large scale display system which produces almost instantaneous display of video signals ("instant replay") which, because it is capable of color images, is very acceptable to viewing audiences.

The most common large scale display devices in use today use incandescent lamps arranged in a matrix and connected so that individual lamps can be selectively excited to create the image whether that image be of alpha numerical characters or pictorial representations. This invention contemplates the inclusion of means which selectively excites colored bulbs clustered together and also controls their level of excitation so as to provided a range of brightness from full off to full on. In this manner, a pictorial representation appears as an image in which persons or other foreground images are clearly delineated from background and some of the subtleties of shadings can be seen.

One system, capable of producing a large scale black and white display in a shades of gray format, in copending application Ser. No. 387,006, filed Sept. 28, 1973, assigned to the present assignee. That system, while quite satisfactory for producing a four shades of gray display, has been found to require extensive improvement when additional gradations in the level of display excitation are desired. Further, the copending application disclosed a system wherein the display board was non-synchronous.

A second system for producing a large scale display is disclosed in copending application Ser. No. 458,850, filed Apr. 8, 1974, assigned to the present assignee. That system is capable of producing eight shades of gray and employs a system whereby the entire display board is synchronized.

OBJECTS OF THE INVENTION

It is accordingly an object of the present invention to provide a color display which closely represents the image being presented.

It is a further object of the present invention to provide a display system which is fully synchronized to provide a simplified system of operation.

It is a further object of the present invention to provide a system wherein by simple adjustment the intensity levels of the display may be varied to obtain optimal image reproduction.

It is another object of the present invention to provide a display which is flexible and allows for the use of various display lamp configurations and which can accommodate a three-phase or single phase power source.

It is still another object of the present invention to provide a system which, although fully capable of providing eight levels of intensity for each color, may selectively be utilized to provide four or two levels should that be desired.

It is a further object of the present invention to provide a display system which is capable of utilizing a digital computer or simply a number of random access memories depending upon the desire of the user.

It is a further object of this invention to provide a large color display system capable of displaying video signals available from a camera viewing a live scene or stored in a memory of either the analogue or digital variety.

It is a still further object of this invention to provide a large color display system capable of displaying an image with variations of gradations of brightness in order to fully delineate the elements of the image.

Another object of this invention is to provide a novel large display system in images to be displayed using animation techniques which may more easily be prepared.

BRIEF SUMMARY OF THE INVENTION

In order to achieve the foregoing and other objects, an embodiment of the invention includes a video to digital converter which may receive a composite color video signal from any number of different sources and which converts the video signal so received into four channels of electrical signals representing the red, blue, green and white components of the signal. The signals are quantized and digitized while the converter produces the synchronizing signals to permit the digital signals to be stored in the memory of a data processor or be directly displayed if desired. Means are provided to control individual display devices arranged in clusters of four in a large matrix of such devices. Each color display device is energized by the corresponding color signal by an amount proportional to the light intensity of a quantized segment of the actual scene.

BRIEF DESCRIPTION OF THE DRAWINGS

The invention itself is set forth in the claims appended hereto while an understanding of an embodiment thereof can be had by reference to the detailed description taken in conjunction with the drawings in which:

FIG. 4 illustrates a cluster arrangement of incandescent bulbs for use on the display according to the present invention;

FIG. 8A is a schematic diagram of the transmission circuitry for the red channel display board interface;

FIG. 9 is a schematic diagram of the red channel upper half module memory registers which form a portion of the display board control logic;

FIG. 10 is a schematic diagram of the control and clock for the display board logic;

FIG. 10A is a timing diagram illustrating the relationship between the display board interface clock and the clocks utilized for the memory registers;

FIG. 11A is a chart illustrating the decoding function performed by the red channel lamp level decoder as the level control value in the phase separator counts down through eight intensity levels;

FIG. 17 is a graph of power versus brightness for incandescent lightbulbs illustrating the different response of an observer to different color bulbs.

DETAILED DESCRIPTION

General Arrangement and Operation

Figure 1:
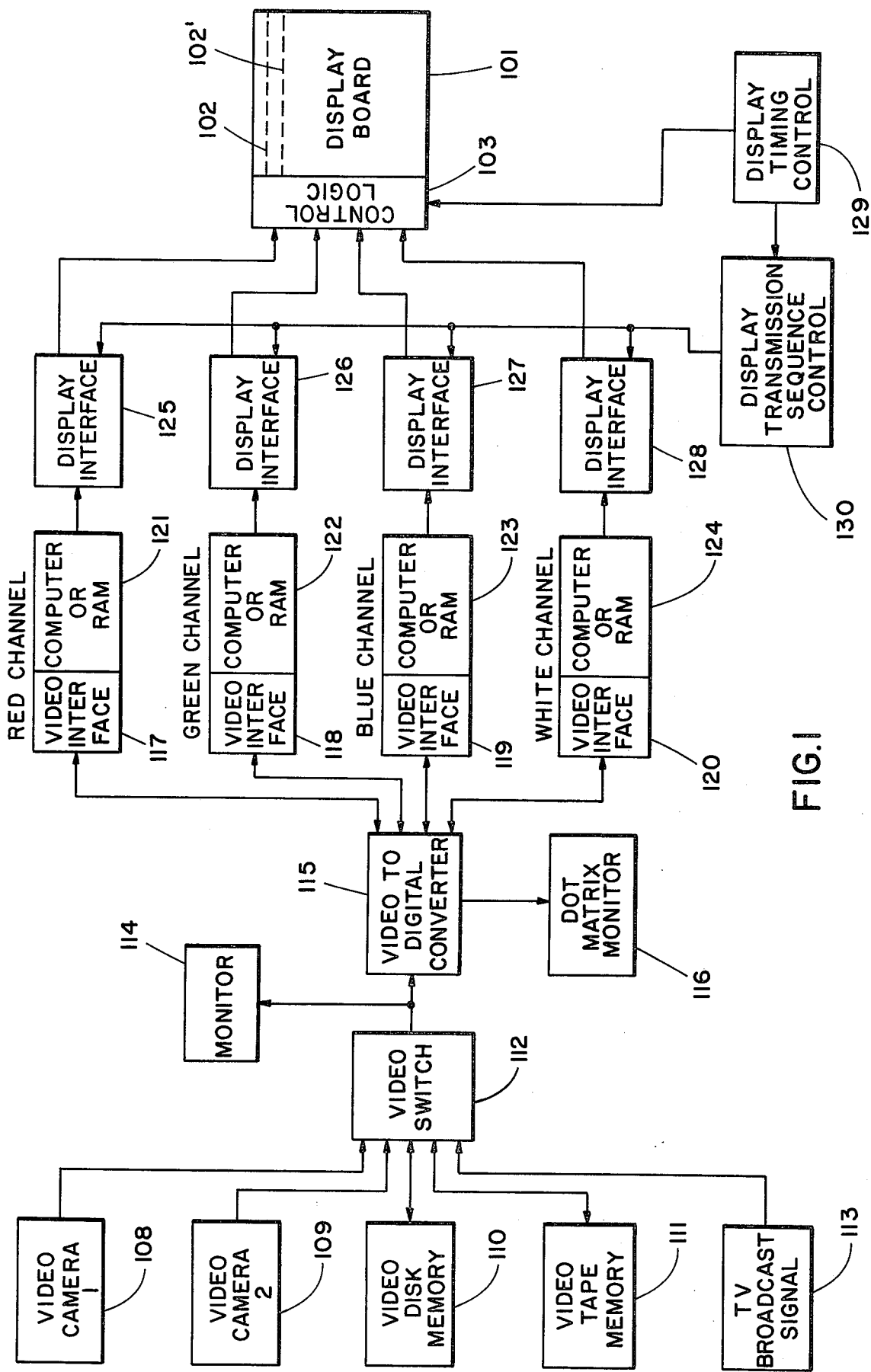
FIG. 1 illustrates in block diagram form the general organization and flow of data in a system in accordance with the invention.

FIG. 1 shows the general organization of one system in accordance with the invention.

In this figure, a display board 101 consists of a plurality of light emitting display devices, in this case, incandescent lamps. The lamps are clustered in groups of four and arranged in a solid matrix consisting of horizontal rows and vertical columns. Each lamp is assigned a numerical address so that digital data representing its desired or commanded level of light intensity can be directed to it and through power control means to be described to cause it to be maintained off or turned on to the degree desired.

It is important to note that the digital data supplied to each individual lamp power control means determines the amount of power to be supplied during the period of time a particular image segment is to be displayed. It is in this manner that an image can be displayed in half-tones so that image delineations or shadings may be seen by an observer. Thus, any lamp in the matrix regardless of color may be excited or supplied with electrical power at any one of a number of levels ranging from off to full on. In the embodiment illustrated, the number of levels is eight, i.e., zero to seven where zero is the off condition and seven is the full on representing the maximum brightness in the scene being displayed.

To facilitate the control of and effect desirable economies with respect to the power to be supplied to the board the lamps are arranged in modules, modules 102 and 102' being identified. A typical embodiment of the board might be modules 60 lamps long and 20 lamps high. The modularization of the board also offers the advantage that certain modules can be assigned or used for special purposes. For instance, a module or group of modules could be used to supply information about a game in progress, games elsewhere or some message while others are devoted to the display of pictorial images.

As stated, each lamp of a cluster is assigned a numerical address in the memory of a data processor or the random access memory (RAM) and the data to be used to control the state of that lamp is stored in that memory location. Thus, the memory is essentially an image of the display matrix. When the display system is to have two brightness levels, one memory field so dedicated may be used for the one bit required to determine whether a lamp is to be on or off. If four shades of intensity are desired, a second memory field is used, for then two bits are required to furnish the desired information. Three fields are used when eight shades of intensity are desired for the three bits which must be stored. Sixteen intensity levels require four fields for the four bits necessary.

In the particular embodiment described, a 12-bit word is used to define the memory locations of 12 lamps of the same color. Because the board has the modular arrangement described it is convenient to assign memory locations so that the first 12-bit word is assigned to the first 12 lamps of the same color at the left-hand side of the top horizontal row while the second 12-bit word is assigned to the 12 lamps immediately below those first 12. Succeeding memory locations are assigned to the next 12 lamps and so on until the bottom of the board is reached and the addressing system then assigns the next memory location to the next 12 lamps in the top row and then continues vertically downward until the entire board is represented in a processor memory field. However, a television field scan proceeds horizontally to complete a line and then vertically. Therefore, the intensity data, when it is stored in the memory or taken therefrom, must be directed to the proper location. As will be seen, this is done by starting the storage of data in the upper left-hand corner but then incrementing each succeeding data word to store it not in the memory location of the lamps below but in that of the next group of 12 lamps in the same row.

Obviously, the particular size of the matrix, of any module, or the allocation of modules to any purpose form no part of the invention and may be varied as desired by a designer. As may be seen, the lamps themselves need not be grouped into modules since each is uniquely defined and may be controlled by data directed by that address.

Connected to the lamps in the board 101 are necessary control and logic elements 103. If desired, auxiliary boards may also be provided in a given installation, each provided with its own control logic. In an athletic stadium installation, the auxiliary boards may be located remote from the main board to provide information such as messages, the score and time remaining in the game in progress.

In accordance with the invention, a video signal can be provided from any number of sources. These may include video cameras 1 and 2, reference numerals 108 and 109, respectively. Camera 108, for example, may be devoted to live action in or around the installation such as the game in progress while camera 109 may be used to photograph film slides or graphics in a control room. A video disc memory 110 or tape memory 111 may be provided to store previously prepared video signals for later display. It is to be noted the arrows indicating the flow of information point in both directions at the output of the video memories 110 and 111 to indicate that video may be inserted into and extracted from those elements. Thus, a video signal from either camera 108 or 109 may be stored in memory 110 or 111 through a switch 112 for display later. This capability could be used, for instance, to permit the recording of video signals during one half of a football game and the highlights to be displayed during halftime. Another source of video signal could be a television network signal 113 supplied in the conventional manner.

The video switch 112 is provided to select the desired video signal whether it is for storage in memory or for immediate display. A monitor 114 may be provided at the output of the switch in order that an operator may observe the video display as desired.

The output of the switch 112 is supplied to a video to digital converter 115. The video to digital converter receives a color video signal which includes a varying amplitude portion representing the variations in light intensity of a horizontal line scan by the camera and the horizontal and vertical sync signal. As is well known in the United States and some other countries, the standard television picture is displayed using an interlaced scanning technique wherein a first field of 262.5 lines is interlaced with a second field of 262.5 lines to form a frame at a frequency so that there are 60 actual fields per second but two fields are required to form one frame giving therefore 30 frames of 525 lines per second.

The video to digital converter receiving such a signal produces as its output: four separate digital representations of the analogue video signal, one for each color red, green, blue and the Y or luminance; signals indicating the start of a frame (top); signals indicating the start of each horizontal line (the left side); signals dividing each horizontal line into segments to which the digital representations are assigned (quantizing). A dot matrix monitor 116 is provided to permit an operator to observe the output of the converter 115.

The output of the converter 115 is supplied to an array of four digital logic and control elements or video interfaces 117–120 for coupling the converter output to data processor memory locations 121–124. The particular data processor forms no part of this invention. Generally speaking, it need only be one that has the ability to process data at the rate which it is supplied and desired as an output and that it be capable of being interfaced with the converter and the display board. The PDP-8/E system manufactured and sold by the Digital Equipment Corporation of Maynard, Massachusetts is suitable as is a Random Access Memory. Each of the four data processors is used generally to store in its memory the digitized video and control signals for one color and to take those signals from memory in response to a programmed instruction in order that they might be displayed.

The memory capability of the data processors may be expanded by the provision of disc memories if desired. Also, data for processing, storage and/or display can be provided through a keyboard (not shown). Timing and data transmission for the entire system is controlled by a display timing control 129 and sequence controller 130.

As mentioned, an alternate embodiment of the invention omits the use of a general purpose data processor such as the PDP-8/E system, and utilizes in its place a Random Access Memory (RAM) interface directly from the digital converter 115 to the display board interface. This latter embodiment may be utilized where disc memory is not necessary and there is no desire to put information into the system through a keyboard input.

Display board interfaces 125–128 couple the outputs of each data process or to the control board logic 103. For athletic events, if desired, a timer may be provided with its output controlling selected lamps or other types of display devices. The timer output may be coupled through the data processor for display on the board.

Summarizing, a composite color video signal is converted to four digital signals, each signal representing variations in intensity for that color and displayed on a large matrix of clustered display devices along with information of a game or messages as desired. In one embodiment, a data processor with a memory capability is used to process and store the digital data. In a second embodiment, a RAM couples the digital output of the converter to the display board interface.

The Video to Digital Converter

Figure 2:
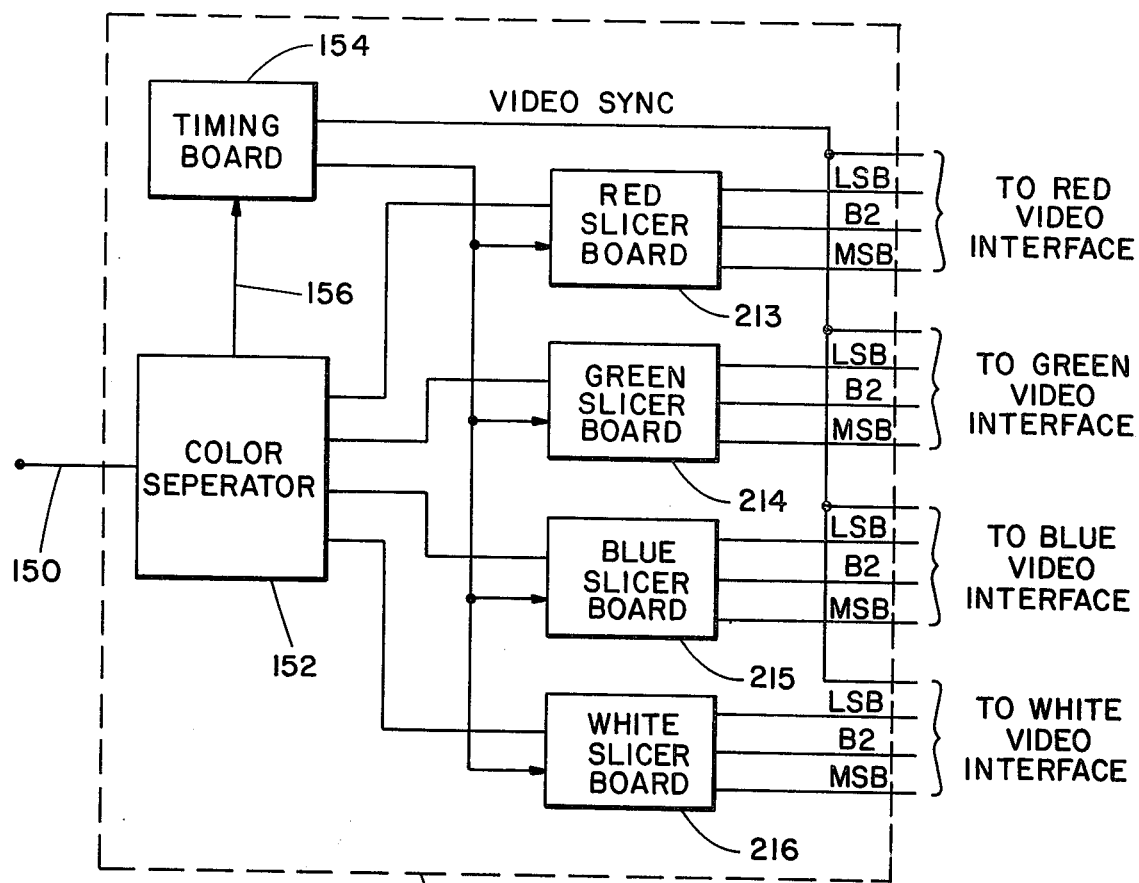
FIG. 2 illustrates in block diagram form a video-to-digital converter which may be used with the invention.

FIG. 2 illustrates the general arrangement of and the flow of data in the digital converter 115. A terminal 150 is provided to receive the video signal from the video switch 112. The incoming video signal is supplied to a color separator 152. The separator 152 may be of a type commercially available and well known in the television art as, for example, a Model 650 Color Monitor manufactured by Tektronics, Inc. of Beaverton, Oregon. The effect of the color separator is to take a composite color signal and separate it into its constituent red (R), green (G), blue (B) chromaticity and intensity (brightness) components. The intensity component assigned to each constituent R, G, B color corresponds to the brightness response characteristic of the human eye for the desired color as defined by the C.I.E. colorimetry diagram. A black and white signal is produced from the green signal which is the counterpart of the signal which would result if a black and white camera were scanning a color surface under identical lighting conditions.

In the present invention, contrary to color television techniques, use is made of the constituent color brightness or black and white signals by providing a separate bulb for each in the clusters. Thus there are four colors transmitted to the display board, red, green, blue and white. Four individual lamps are controlled according to the intensity of the signal represented in that channel. The white or plain bulb is required for large display board applications to produce intense light for daylight viewing and pastel colors such as sky blue, light green, etc. This is due to the use of incandescent bulbs rather than phosphors as in color television applications. In color television, the brightness signal is merely used to modulate the intensity of the red, green and blue chromaticity signals (channels). For discussion purposes, then the present system may be considered to display four dots or color channels whereas a color television system displays only three dots or color channels.

From the color separator 152 the four color channels are provided to the red, green, blue and white slicer boards 213–216 for digitizing the data of each color channel. A timing board 154 receives a sync stripping signal on line 156 from the color separator. This signal is obtained from the video signal during the process of separating it into its components.

Figure 3:
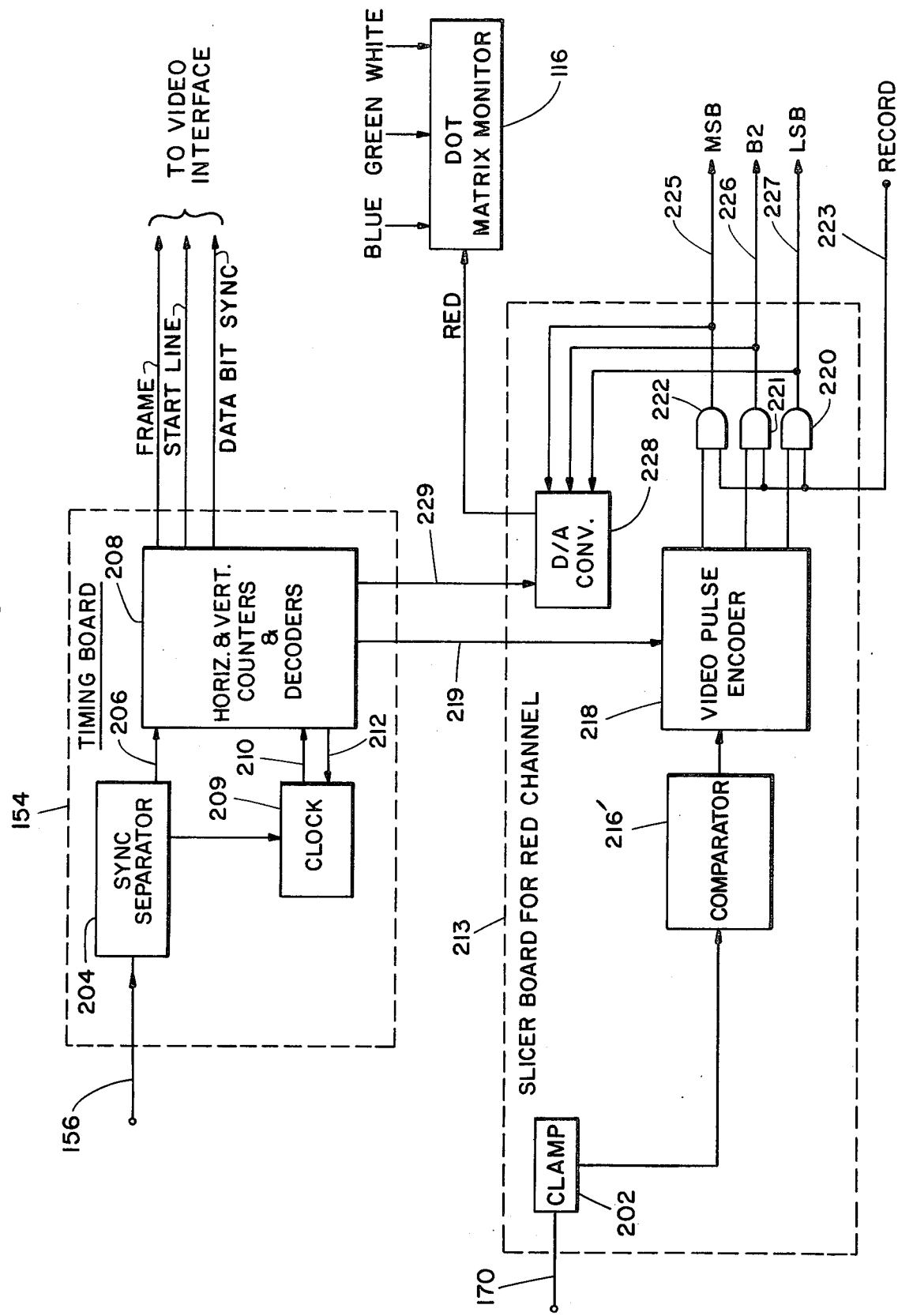
FIG. 3 illustrates in block diagram form the timing and slicer board circuits which form a portion of the video-to-digital converter.

Referring now to FIG. 3, the timing board 154 and one of the four slicer boards are illustrated in greater detail. Although only the red slicer board 213 is illustrated in FIG. 3, it will be appreciated that identical timing signals are provided from the timing board 154 to each of the remaining three slicer boards 214–216.

The incoming red channel video signal is supplied to a clamping circuit 202 to establish its base or full off level at zero volts so a constant value at which to effect the digital conversion is provided. The sync signal from line 156 is, of course, the horizontal and vertical sync information extracted by the color separator from the composite video signal. The vertical sync signal, separated by a sync separator 204, is supplied via line 206 to horizontal and vertical counters and decoders (HVCD) 208 while another output, the horizontal sync signal, is supplied to a clock 209. The clock 209 is designed to operate at a variable frequency so as to produce a train of pulses used ultimately to divide each horizontal line scan of the analogue video signal into segments whose amplitudes are to be converted to digital values. Therefore, the clock output is supplied via 210 to the HVCD 208. To ensure accuracy of the clock, that is, to ensure that each horizontal line is always equally divided, an output of the HVCD 208 is supplied via 212 as an input to the clock and is effective to control its frequency.

As shown in FIG. 3, the digital conversion for the red color channel is effected by the slicer board 213 which receives as its input a video signal from the color separator 152 on line 170. The video signal is clamped by clamp 202 and supplied directly as an input to a comparator 216. The comparator produces discrete outputs to represent the extent to which the amplitude of that signal varies between off and a peak value of brightness preset in the comparator. Identical processing occurs in each of the remaining three slicer boards 214–216.

The output of the comparator 216 is supplied to a video pulse encoder 218 which produces, for each selected pulse output of the clock 209 supplied via line 219, a coded representation of the amplitude of the video signal during that selected clock pulse. The outputs of the encoder 218 are further buffered by the gates 220, 221 and 222 into a three-bit code. In the embodiment illustrated and described where the comparator produces eight levels of output, such a three-bit code would represent all eight levels in the following manner:

| Level | Three-Bit Code |
|-------|----------------|
| 1 | 000) |
| 2 | 001) |
| 3 | 010) |
| 4 | 011) |
| 5 | 100) |
| 6 | 101) |
| 7 | 110) |
| 8 | 111) |

The left-hand digit of the code is the most significant bit (MSB), the middle digit is identified as bit number 2 (B2), while the right-hand digit is the least significant bit (LSB).

Depending upon the degree of delineation desired, the number of bits used can be varied. Thus, a four-intensity level system for each color channel could be provided by using only MSB and B2 bits of the three-bit code. Eight levels will use all three bits, as follows:

|         | MSB | B2 | LSB |
|---------|-----|----|----|
| OFF     | 0   | 0  | 0  |
| LEVEL 6 | 0   | 0  | 1  |
| LEVEL 5 | 0   | 1  | 0  |
| LEVEL 4 | 0   | 1  | 1  |
| LEVEL 3 | 1   | 0  | 0  |
| LEVEL 2 | 1   | 0  | 1  |
| LEVEL 1 | 1   | 1  | 0  |
| FULL ON | 1   | 1  | 1  |

For the red channel the MSB is produced at gate 222, B2 at gate 221 and LSB at gate 220. These bits are produced in response to a Record signal supplied via line 223 to the gates 220, 221 and 222 from the video interface 117, as will be explained hereinafter. In response to the presence of the Record signal, the output of the gates is supplied to the video interface via conductors 225, 226 and 227 and also to a digital to analogue converter 228 which produces an analogue signal of the actual output of the video to digital converter for display on the dot matrix monitor 116. A sync signal for the converter 228 is supplied from the HVCD 208 via line 229.

The video to digital converter 115 therefore receives a color video signal, separates it into blue, green, red and white color channels, converts it to digital data and produces the necessary synchronizing and control signals. An output for a monitor to permit viewing of the converted video is provided. Other features and capabilities of the converter are explained in conjunction with a detailed description of the timing and slicer board circuits contained in copending U.S. application Ser. No. 387,006 hereby incorporated by reference. Specifically, reference is made to FIGS. 2–7 of that application and the corresponding portion of the detailed description.

The Video Interface

It should be understood that the embodiment illustrated is by way of exemplification only, for the interfaces to be used for each color channel is determined by the data processor used and may be varied by a designer. The important criteria are that the interface be capable of inserting the digitized video data in a memory device and calling that data from the memory as desired for display.

Generally speaking, it is contemplated that the digital data necessary to display a picture go into the processor memories at locations specifically assigned to individual display devices in the matrix and be recalled from the memory in the sequence desired.

To accomplish this in the color embodiment described, where the memory is of the magnetic core type, three memory fields are used, one each for the MSB, B2 and LSB data for each video frame.

The output from the timing board 154 of the converter 115 is, for each frame, a Frame Pulse at the beginning of each frame, a Start Line signal at the beginning of each horizontal line in a frame and the necessary Data Bit Sync (DBS) for each frame. These signals control the video interface operation as explained in copending application Ser. No. 387,006. The DBS pulses are each associated with the light intensity data (MSB, B2 and LSB bits) used ultimately to control a particular display device in the matrix.

It is again noted that standard television display in the United States is at the rate of 60 fields per second and the video-to-digital converter produces digital data for display at the rate of 30 frames per second. For practical reasons in the operation of the display matrix it has been found that if it displays frames at the rate of 15 per second a very satisfactory display is achieved. Therefore, one function of the video interface is to divide the frame input rate by two and so it stores frames at the rate of 15 per second. These particular numbers are, of course, not critical and may be varied by a designer.

The particular data processor which may be used in this embodiment is a PDP 8/E computer manufactured by the Digital Equipment Corporation of Maynard, Massachusetts. This computer, as do many others, uses a 12-bit computer word. Thus, for example, the red channel MSB data, for one horizontal line of a module 72 lamps long, is contained in six computer words: (72/12). The additional red channel B2 and LSB data, necessary for eight levels of intensity therefore requires 12 additional words. A total of 72 words are required for all four colors and eight levels of intensity.

The video interfaces 117–120 operate in response to initiation by an operator who instructs a program to transfer digitized video data into or out of the processor memories. One mode of transfer is called the Record Mode where successive video frames are transferred into the memories at the approximate rate of 15 frames per second depending on the buffering arrangement. Another mode of transfer is the Graphics Mode where a single frame is transferred. After storage, this frame may be inspected on the dot matrix monitor and then transferred to a disc memory to be recalled for later use. This mode may be used for storing slides, still pictures or messages. The interfaces also permit digitized video stored in memory to be displayed on the dot matrix monitor 116.

The transfer of data into and out of the memories of the PDP 8/E or a set of four RAMs is accomplished using a Data Break transfer (Data BRK). The "Digital PDP 8/E Small Computer Handbook" published in 1971 by Digital Equipment Corporation of Maynard, Massachusetts describes its data break system in Chapter 6. Generally, such a system takes over a processor memory cycle for the purpose of transferring data into and out of memory and requires a register to receive the data word being transferred, a memory address and a program to instruct the processor. Chapter 10 of the above publication provides an explanation as to how devices such as the video to digital converter and the large display matrix with its controls and logic 103 may be interfaced with the PDP 8/E using the data break capability.

Video Control Signals

Before continuing with the description of the invention, it is pointed out that the video to digital converter 115 during a conversion operation is producing signals necessary to synchronize the operation of the interface and the converter. These signals as used in the interface are designated as the DATA BIT SYNC, FRAME and START LINE signals. The first of these, DATA BIT SYNC, are the clock pulses of the converter and determine the time or sampling interval during which a horizontal video line is sampled. The latter two signals provide the information indicated by their designations. These three signals are used in conjunction with signals generated by the data processor to control the data transmission when a digitized video image is transferred from the video system to core memory or vice versa. The detailed circuitry of the video interfaces is shown and described in copending application Ser. No. 458,850 filed Apr. 8, 1974. That application is hereby incorporated by reference and specifically FIGS. 3 and 4 and the corresponding description.

The Memory Address Generator

As stated previously, the digitized video is stored in the processor memory at specified locations corresponding to the location of the lamps on the display board. For example, the twelve red lamps in the first horizontal row starting in the upper left-hand corner have corresponding memory locations in one memory field for the MSB data and corresponding memory locations in two more memory fields for the B2 and LSB data. The 12 red lamps immediately below the first 12 are assigned the next memory location. However, since a television scan is from left to right along one horizontal line until it is complete, it is necessary when storing data in the processor to store the first work in the first memory location and to store the next word not in the next location but rather in a memory location, the address of which is incremented from the first by a number equal to the number of horizontal lines.

The necessary memory addresses may be generated by the circuits shown and described in the aforementioned copending application Ser. No. 387,006 incorporated hereby, specifically, FIGS. 10 to 18 and the corresponding description.

As will be readily understood, the circuits of the just mentioned copending application Ser. No. 387,006 for generating memory addresses are disclosed as being capable of doing so for three bits of data, i.e., MSB, B2 and LSB. However, the example there illustrated provides for use of only the MSB and B2 data for providing a four intensity level system. The present color system, utilizing eight levels of light intensity for each color, makes full use of the capability of those circuits for generating addresses for all three data words. This is accomplished by providing the circuits with an additional serial/parallel register for each color channel to accommodate the LSB data words.

Main Board Display

Figure 5:
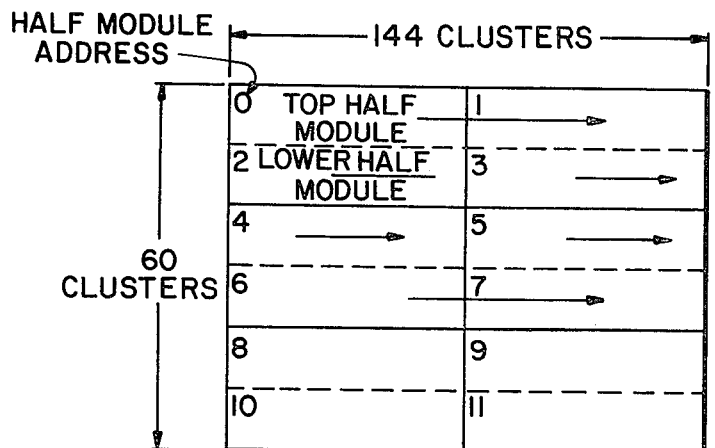
FIG. 5 is a block diagram illustrating the arrangement of display board modules on a display board.

A large display board on which the converted and quantized video data which has been stored may be displayed, may for example be constituted by a board which is 60 clusters of lamps high and 144 clusters of lamps long. The general organization of such a board is shown in FIG. 5 and the arrangement of each cluster in FIG. 4. Because there are a substantial number of lamps involved, it is desirable to supply the electrical power required using a three-phase system and to distribute the lamp loads substantially equally over the three phases. Likewise, for each of manufacture, assembly and service it is convenient to divide the board into a number of modules and to further divide each module in half. As an example, each module may be 20 clusters high and 72 clusters wide. However, the particular number of lamp clusters, the height, the width and number of modules and dimensions of the modules all may be selected by a designer to suit his particular purposes.

It has been found desirable when transmitting data to the board to display an image, to transmit it from the top down. Thus, as indicated by the arrows shown in FIG. 5, data necessary to light the lamps is supplied beginning in the upper left-hand corner and moves to the right across the board. The next group of data begins at the left side of the board and again moves to the right, this process being repeated until the board image is completely transmitted. As will be appreciated, the data is supplied at a rate that does not permit an observer to detect the motion of the transmission. An observer, therefore, sees a display on the board practically instantaneously, and in the case of a display of video images the impression is quite similar to that appearing on a television screen.

FIG. 4 illustrates a possible arrangement for each cluster. Four bulbs 300–303, each of a different color, are mounted equidistant from the center on a circular member 304. A shield 305 perpendicular to the plane of the figure surrounds the bulbs to provide light isolation between adjacent clusters. Depending on the application, a translucent diffuser may be desirably fitted over the cluster to insure mixing of the colors as viewed by an observer. Of course, other physical arrangements can be utilized as desired. Conceptually each cluster is one color dot in a matrix of such dots. The matrix produces a color image of the digitized video information supplied to it.

Figure 6:
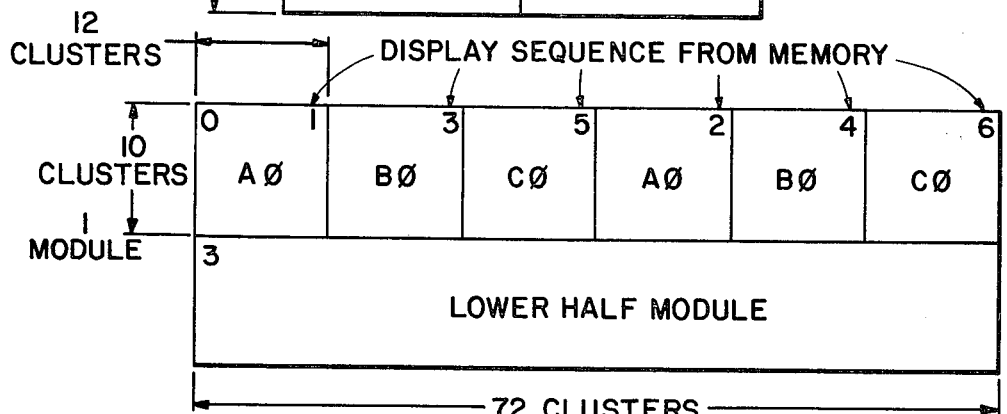
FIG. 6 is an enlarged view showing one complete module including the upper half and lower half modules and indicating the order in which data is displayed on each half module.

FIG. 6 illustrates in somewhat greater detail the general arrangement of each module. Each module is constituted by an upper half and a lower half. Each half is preferably further divided into six submodules each 12 lamp clusters long and 10 lamp clusters high for a total of 480 lamps (120 clusters times four bulbs per cluster). The data for a given channel is transmitted in three parallel "bursts" of 240 bits each. There are three bursts transmitted in sequence and designated as the A, B and C bursts. To light any module the lamp data associated with the A-phase lamps is transmitted first, then the data associated with the B-phase, and finally the C-phase. Each submodule is connected to be supplied by one of the three phases of the power supply so as to provide for a substantial load balancing. In FIG. 6, in the uper half module, the two A-phase submodules are transmitted before the two B-phase submodules, etc.

Triac cards may be used to control the lamps. Any other similar semiconductor switching device may be utilized. As is well known, a Triac is a semiconductor switching device in which a control signal applied to a control electrode causes the device to conduct in a selected portion of a half cycle supplied to a load to thereby control the energization of the load, the load in this case being an incandescent lamp. By determining the point in each half cycle of supplied voltage that the lamp goes on, the brightness of the lamp is determined.

Data Extraction from Memory and Transmission to the Display Board

It has been previously explained how the data processor's data break facility may be used to store the digitized video signals in the processor memory at specified memory locations in a memory field so as to provide an image of the display board. Similar techniques are used to extract the stored data from the memory with an essential difference being that the data is not extracted from memory locations in the same sequence in which it was inserted. When the data was inserted the first word was stored at memory location 0000 in each of the four memories. This memory location corresponds to the first 12 lamps of a given color in the first row starting at the upper left-hand corner of the board. The next data word stored was that for the next 12 lamps in that first row with the process being continued until all of the words for the first row were stored and then the storage of the lamps for next row commenced beginning at the left-hand side of that row.

As has been explained previously, the data for the lamps is not transmitted in that sequence. Therefore, it is necessary to extract the data from the processor memory in a sequence corresponding to that in which the lamp data is transmitted. The sequence of transmitting the lamp data begins on the left side of the first horizontal row; therefore, data is first extracted from memory location 0000. The next data word is extracted from memory location 0001 which is the memory location for the data intended for the 12 lamps on the left-hand side of the second horizontal row. In order to do this, the system includes a memory address generator which is effective to generate memory address signals in the desired sequence.

Figure 7:
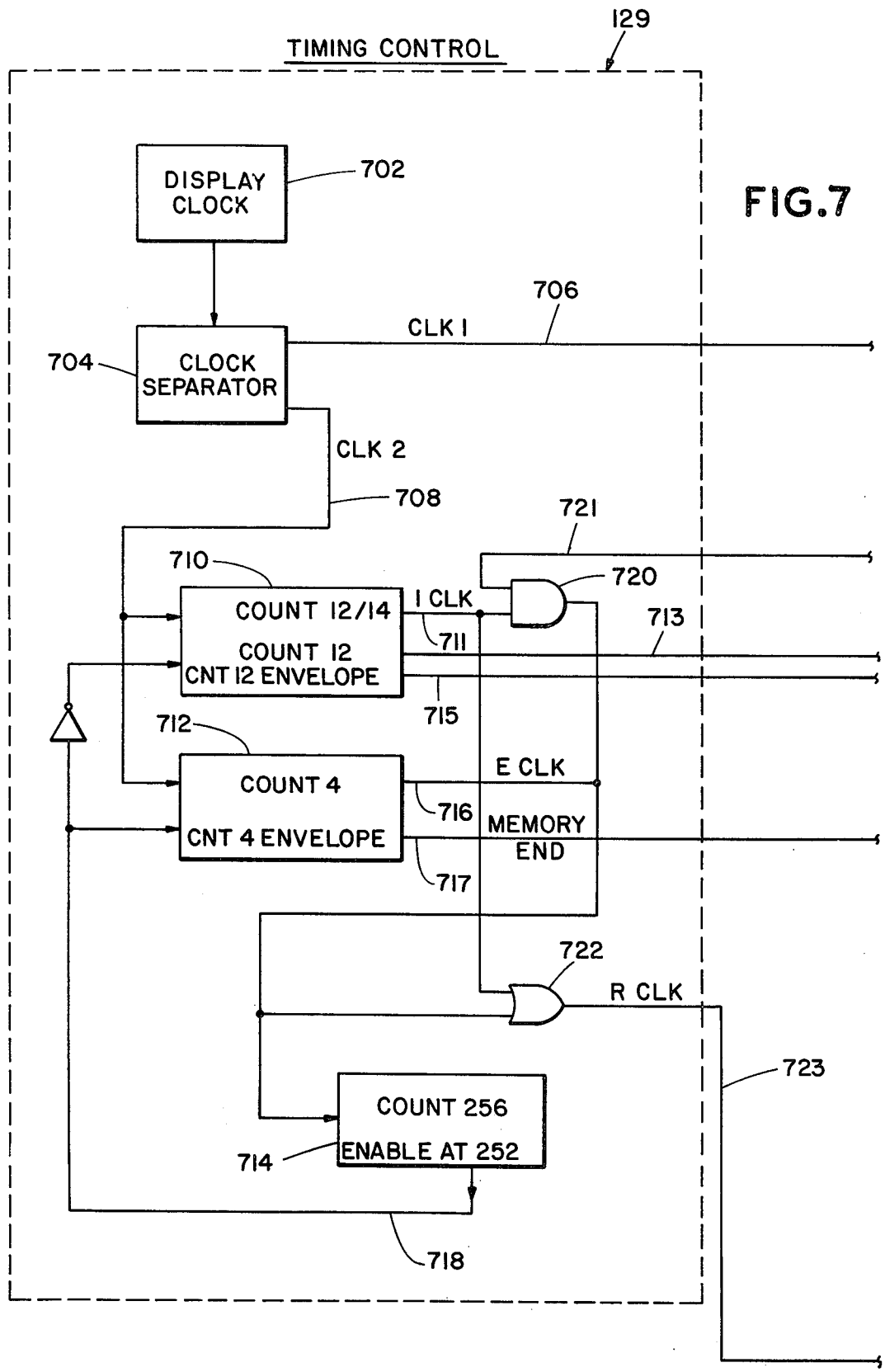
FIG. 7 is a schematic diagram of the timing control circuit for the display board interface.

Referring to FIG. 7, the display timing control 129 for the display board interfaces 125–128 is shown. The timing control 129 includes a display clock 702 and a clock separator 704. The clock 702 is conveniently a crystal clock having a frequency on the order of 8 to 10 megahertz. The timing signals developed from the clock 702 are utilized to synchronize the entire display board in the manner to be described. The clock separator 704 is essentially a frequency scaler or divider and is effective for producing two separate clock signals of a lower frequency as outputs therefrom.

The outputs from the separator 704 are the CLK 1 and CLK 2 signals indicated on lines 706 and 708. Conveniently, these signals maybe approximately 2 megahertz. CLK 2 is provided, via line 708, as an input to counters 710 and 712. An additional counter 714, is provided for a purpose to be described. Counter 710 is arranged to produce three outputs which are utilized by the system. The output on line 711 is an interrupted clock signal (I CLK) and consists of 12 pulses and then two blank intervals. In other words, it produces a pulse output 12 out of 14 input clock pulses. Line 713 is a count 12 output, that is to say, an output pulse is produced every 12th pulse. Line 715 is a count 12 envelope, that is, the signal on line 715 stays high for 12 counts, goes low, and then goes back up again for 12 more counts.

Counter 712 operates in a similar manner when enabled by counter 714, producing a count 4 output on line 716 designated "E CLK" for end clock. On line 717, counter 712 produces a count 4 envelope designated as MEMORY END (MEM END) when enabled by counter 714.

Counter 714 monitors the operation of the other two counters keeping track of the number of times that the counters have performed their functions. When counter 714 reaches 252 it provides an output on line 718 and is effective for resetting counter 710 and enabling counter 712. Counter 714 counts the pulses from I CLK via AND gate 720 except when its counting is inhibited by AND gate 720. Gate 720 is disabled by line 721 which goes low when the sequence control 130 illustrated in FIG. 8 is sending a data address stored in the computer, as will be described.

The output of AND gate 720 is also provided as one input to OR gate 722, the other input being I CLK from line 711. The output of OR gate 722, R CLK, is provided on line 723. E CLK, line 716, from the counter 712 is also provided as an input to the OR gate 722.

As thus far described, it will be seen that the timing control circuit 129 produces a CLK 1 and CLK 2 signal. The CLK 2 signal is provided to a pair of three counters which have their outputs connected through various logic elements to produce R CLK, count 12, count 12 envelope, E CLK, and Memory End.

Figure 8:
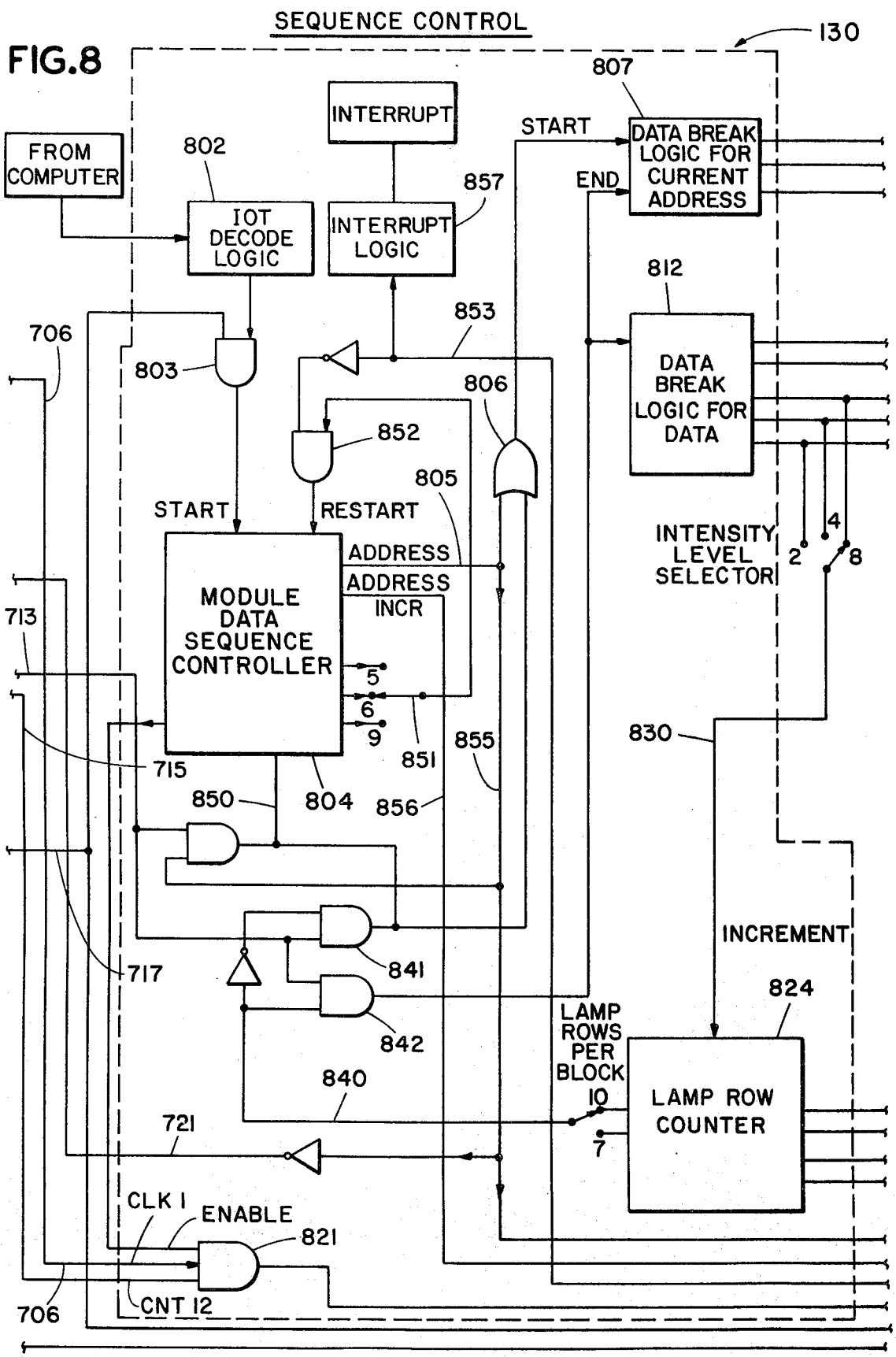
FIG. 8 is a schematic diagram of the control circuitry for the display board interface.

Referring now to FIG. 8, the sequence control circuit 130 is shown. This circuit receives timing information from the FIG. 7 circuit, and in response thereto causes the memories for each color channel to be addressed to obtain the lamp level data stored therein when in a display mode.

The sequence control 130 may receive its instructions from one of the computers which acts as a master in addition to storing the data for one of the color channels. Alternately, where RAMs are used for storage, a simple switching arrangement operated by a person may select the mode. IOT logic 802, a software interface such as is well known in the art and which is entirely dependent upon the particular processor being used, receives the instructions. Reference is made to the DEC 8/E handbook for appropriate IOT decoding logic. After decoding, the h instructions are provided via AND gate 803 to a Module Data Sequence Controller 804. The other input to AND gate 803 is the Memory End Signal from line 717 (FIG. 7) which ensures that the system begins operation at the proper time.

The Sequence Controller 804, which is merely a gated shift register and counter, upon receipt of the start signal from AND gate 803, produces an output on line 805 to OR gate 806 effective for starting data break logic 807. Data break logic 807 initiates a preliminary data break in all four color channels to obtain the address of the stored data in each channel's memory. This is accomplished by enabling a current address pointer located in each of display interfaces 125–128. For purposes of discussion, reference will now be made to the display interface 125 for the red channel. It will be understood that the description applied equally to the green, blue and white channels. In FIG. 8A the red channel address pointer is numbered 808. The logic 807 and pointer 808 are storage interface circuits designed for the particular computer or memory utilized.

Pointer 808 contains a lookup table and in a manner well known in the art, produces an address which is supplied to the computer 121 storage via the computer memory address bus (MA bus) 809. The address specified by the pointer 808 causes the computer to provide the initial storage address of a selected block of lamp intensity data in memory. The initial address is provided on memory data bus (MD Bus) 810.

When the initial address of the intensity data is received on the MD Bus 810, it is provided to the current address register (CA Register) 811. In turn, this initial address is provided to the MA Bus 809 for obtaining the intensity data when the CA Register is enabled. The computer then goes to the location specified by the initial address and loads intensity data onto the MD bus 810. This is the MSB, B2 and LSB data.

After the initial address is obtained, further data requests from the compter are controlled by data break logic 812. Logic 812 is effective for causing three successive data breaks to occur for obtaining from computer storage the three 12-bit words necessary to generate the eight intensity levels. It will be recalled that each 12-bit word represents one horizontal row of 12 lamps of a given color in one module. The first 12-bit word provides the MSB data word for that row of 12 lamps, while the second 12-bit word obtained by the second data break contains the B2 information, and the third data break which obtains the third 12-bit word contains the LSB information. The DATA BRK logic 812 successively increments the address stored in the CA Register 811 for obtaining from the next storage location the desired display data on the MD bus 810 in accordance with the data break capability of the DEC 8/E processor.

Information received on the MD bus 810 is loaded in parallel into one of a pair of parallel-to-serial shift registers 814 or 815, 816 or 817 and 818 or 819. Registers 814 through 819 are provided with a common clock on line 820 via AND gate 821. This clock is CLK 1 from line 706 of FIG. 7 ANDed with an enabling signal from the Sequence Controller 804 and with the count 12 envelope from line 715, FIG. 7.

When enabled registers 814 and 815 alternately receive the LSB data words from the MD bus. Similarly, registers 816 and 817 receive the B2 data words while 818 and 819 receive the MSB or address data words. The correct register pair is selected by the particular LOAD enable line 831–833 the data break logic 812 sends high. Selection of which one of each pair of registers is to receive the data word obtained by the data break under the control of logic 812 is determined by a lamp row counter 824. The lamp row counter 824 controls the operation of the three pairs of registers according to a technique known as double buffering. That is, the top register 814 is loaded with data while the bottom register 815 transmits data and vice versa. A similar technique is used for each of the remaining two pairs, 816 and 817, and 818 and 819. Transmission from the registers 814 through 819 to the control logic at the display board is enabled by lines 825 or 826 supplied as one input to AND gates 827 and 828, the other input to the AND gates being from the registers 814 through 819.

The lamp row counter 824 receives as its input a signal from the data break logic 812 on line 830. Depending upon the number of intensity levels 2, 4 or 8 to be utilized by the system, line 830 is connected to a corresponding one of LOAD enable lines 831 to 833 from the data break logic 812. Thus, for an eight level system, line 830 is connected to line 833. In this position the counter 824 increments every third data break.

When the lamp row counter receives a signal on line 830, it increments its count by 1. Loading and sending of data then continues in the manner just described until the lamp row counter reaches the preselected value corresponding to the number of horizontal rows in the half module display being utilized. When the counter reaches, for example 10, it produces an output on line 840 effective for switching the latch pair 841 and 842. Prior to switching, gate 842 conducts enabling data break logic 812.

The latch pair 841, 842 change state when line 840 goes high. This is effective to restart logic 807 and disable logic 812. Specifically, when gate 842 conducts logic 807 is disabled and logic 812 is enabled. When gate 841 conducts, the opposite conditions exist which are effective for placing the circuit back in the start mode by causing an output from gate 841 to data break logic 807 which then seeks a new address for locating the next block of stored information.

Sequence Control and Display Interface Operation

Reviewing the operation briefly, it will be apparent that on command the IOT decode logic 802 via AND gate 803 initiates operation of the circuit by providing a start signal to the Module Data Sequence Controller 804. The Sequence Controller provides an output on line 805 effective for providing a start pulse to the data break logic 807 to obtain an address where display data is stored.

Logic 807 causes the current address pointer 808 for the red channel to supply an appropriate address to the computer MA Bus 809 which is turn causes the computer 121 to supply on the MD Bus 810 the address of the stored display information. This address is then loaded into the CA register 811 and, under the control of the data break logic 812, three data breaks (DATA BRK) are performed, to obtain the display information stored in the computer. As each data break is performed, the computer supplies the received data to the MD bus. The CA register is then incremented for the next DATA BRK. This display information is fed parallel into the correct one of registers 814 through 819. The first data break of display information is provided to register 818, as this will be MSB information. The second data break will be provided to register 816 which will be B2 information, and the third data break will obtain LSB information fed to register 814.

After the first three data breaks, if eight intensity levels are utilized, a signal is provided on line 830 to the lamp row counter 824 effective for switching the registers 814–819 so that the next data breaks will load registers 819, 817 and 815. A signal is also provided on line 826 causing the display information to be transmitted from the just loaded registers 814, 816 and 818. At the completion of each three data breaks, the lamp row counter imcrements by 1 until it reaches the last horizontal row to cause the latch pair 841, 842 to change state. Thus, after the first three data breaks, the data break logic 812 will initiate additional data breaks. If the half module for which data is being obtained has 10 vertical rows of lamp clusters, a total of 30 data breaks are performed by the data break logic 812 before the latch pair 841, 842 is caused to change state.

On completion of 10 cycles or 30 data breaks, the latch pair flips to stop the data break logic 812. This is necessary because a complete block of lamps has been filled, and it is necessary to obtain an address location of stored data for the next block. The flipping of the latch disables the data break logic 812 and restarts data break logic 807 to obtain the next address location. Each time that a block of lamps is completed and the latch pair 841, 842 switches state, the Sequence Controller 804 is incremented via line 850.

The Sequence Controller includes a counter which keeps track of the number of lamp blocks which have been provided with data. When the counter reaches the value selected by switch 851, corresponding to the module length, this is an indication that a complete half module has been provided with data. Any number may be set by the switch 851 depending upon the particular board configuration desired. When the counter reaches the number selected by the switch 851, a restart signal is provided via AND gate 852 to the Sequence Controller for initiating another entire cycle for the next half module.

The restart signal is ANDed with an inverted signal from line 853 supplied from the half module address register 854 (FIG. 8A). The half module address register 854 is a counter which keeps track of the total number of half modules which have been supplied with data. This counter is incremented via line 856 each time a signal is received by the Sequence Controller on line 850. When the half module address register indicates that the entire board has been completed, an address limit signal is produced which disables the AND gate 852 preventing a restart of the Sequence Controller. This same signal, on line 853, is also effective for operating the interrupt logic 857 causing the computer program to assume control of further processing. In normal operation, when an interrupt is produced, either a further command for data retrieval and display is given or other instructions as desired by an operator are provided. It should be noted that only one half module address register such as register 854 is required to signal the completion of the entire board.

An enable signal for the register 854 is provided on line 855. Line 855 also identifies data transmission from the MSB register 819 as being address data rather than lamp display data at the beginning of each one-half module cycle. Address data from the register 854 is loaded via lines 855' into register 819.

Alternate Embodiment Utilizing a Random Access Memory (RAM)

Referring to FIGS. 8 and 8A, if not required, the use of four digital computers such as the DEC 8/E's can be omitted. Instead of the digital computer, a random access memory (RAM), well known in the art, can be substituted for each computer. The data to be stored in each RAM is provided from a corresponding video interface 117–120 in a similar manner as has been described for the digital computer embodiment. The interface between the RAM and the display board is also substantially identical to that shown in FIGS. 8A and 8B with the following changes.

The IOT logic 802 and the interrupt logic 857 are omitted. Instead, operation of the system is initiated by a start-stop command provided directly to a three-input AND gate 803, the other inputs being the video sync signal and the memory end signal as in the computer version. Additionally, in place of the data break logic 807, a read-only memory (ROM) address control is used for controlling a ROM pointer identical to the pointer 808 in FIG. 8A. The operation of the alternate circuit is as described for the computer embodiment. The ROM address control causes the ROM pointer to obtain from the RAM the address where the lamp intensity information desired may be found. The information is supplied on the MD bus in the manner as previously described.

The RAM and ROM storage and retrieval is typical of most RAM/ROM systems and is well known to those skilled in the art. The ROM is used as a lookup table for the RAM addressing. The RAM and ROM combination will preferably have a read and write cycle time of approximately 1 microsecond.

Display Board Control Logic

Referring now to FIGS. 9 and 10, a first portion of the display board control logic is shown. Nine recirculating memory registers are provided for the upper half module of each color channel. FIG. 9 illustrates the registers for the red channel. It will be understood that four similar sets of nine registers each are provided for the lower half module color channels. Since thhe lower half memory registers are identical to the upper memories, they are omitted for simplicity of illustration.

Both the upper and lower half module memory registers are controlled by the circuit shown in FIG. 10 which includes an output counter 900 receiving the Memory End signal from the display board interface and the R CLK signal from the timing circuit as inputs. Counter 900 determines the proper Triac address for received data, as will be described. An address register 901 receives as its inputs R CLK, the address indicator from line 855 and the MSB/address input. The address register determines, based on the MSB/address input whether the incoming data belongs in the upper half module or the lower half module and operates one of AND gates 902 or 903. The outputs of the AND gates 902, 903 control the operation of write controller 904. Write controller 904 is effective for enabling data to be received by the upper half or lower half module registers.

The R CLK and Memory End signals are also applied to a clock phase splitter 905 and a clock delay 906. The phase splitter 905 produces two alternating clock pulse trains having the relationship shown in FIG. 10A. Both clock pulses are supplied to each of the memory registers for the upper and lower half modules. The clock splitter and its resultant two-phase clock outputs are required since the memory registers are preferably implemented using CMOS technology, as is well known in the art. It is also possible to implement the memory registers using Transistor-Transistor logic (T²L) and in that case clock phase splitter 905 is unnecessary.

Referring now to FIG. 9, the arrangement of the nine upper half module memory registers for the red channel will be described. The top row of three registers, 910, 911 and 912 are adapted to receive on line 913 the MSB or address data from the display board interface. Only one register stores the data and this selection is controlled by a signal on one of lines 914, 915 and 916 from the write controller 904 (FIG. 10). The write controller selects the proper register based on the information received from the address register 901. Similarly, the B2 data is provided to one of registers 917, 918 or 919 again according to which one of lines 914 through 916 is high. In the same manner, one of memory registers 920 through 922 is selected to receive the LSB data from the display interface.

Figure 11:
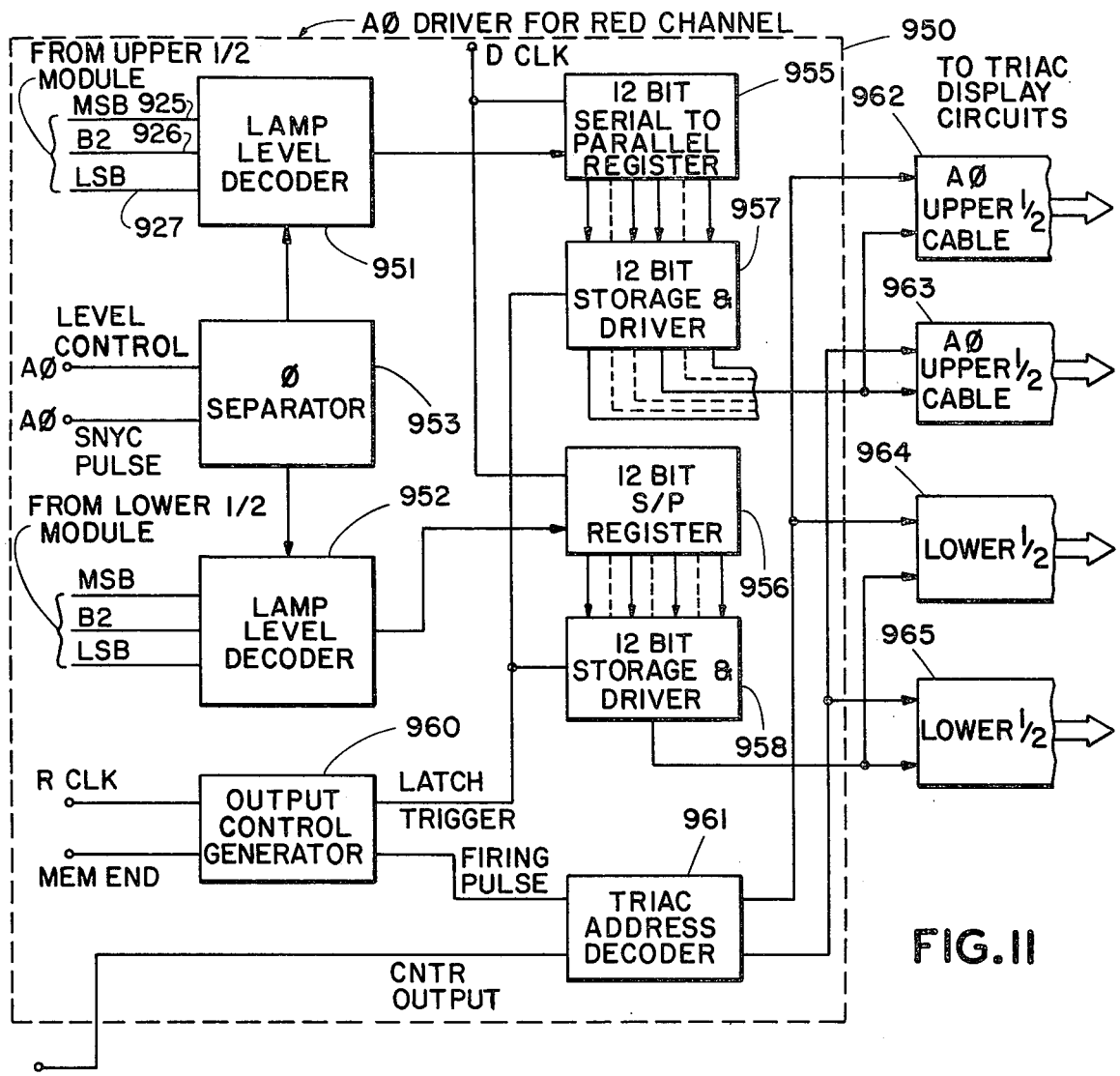
FIG. 11 is a schematic diagram of the red channel driver circuit for the A-phase of the display board.

The outputs from the memory registers are transmitted by phases. That is, the A-phase registers for the MSB, B2 and LSB data are taken on lines 925 through 927, respectively, and provided to an A-phase driver circuit for the red channel which is illustrated in FIG. 11. In a similar manner, registers 911, 918 and 921, which constitute the B-phase memory registers, have their outputs provided to a B-phase driver circuit. In a similar manner the C-phase registers 912, 919 and 922 outputs are provided to a C-phase driver.

Figure 12:
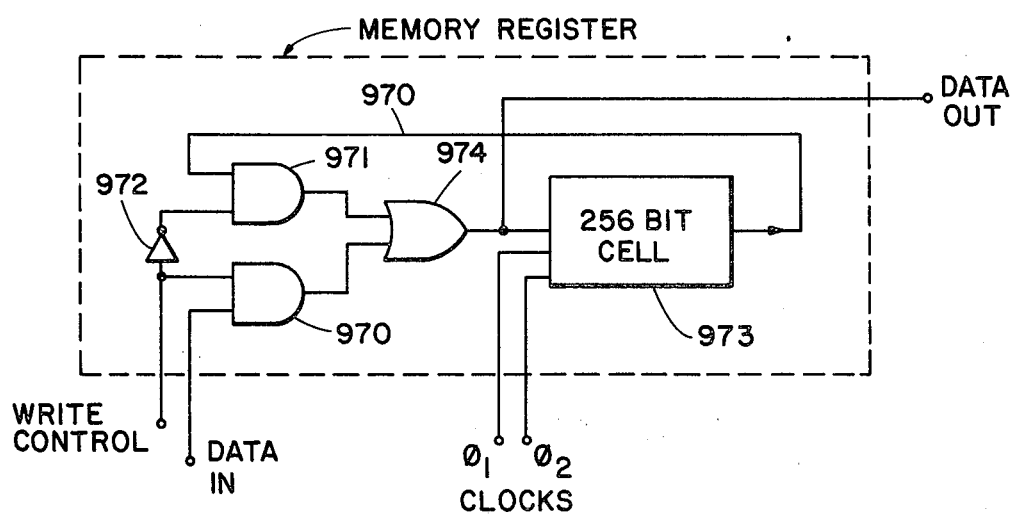
FIG. 12 is a schematic diagram of the memory registers of FIG. 9.

Each of the memory registers is identical in construction. A schematic drawing of the memory register is shown in FIG. 12 utilizing CMOS technology. A control signal from write controller 904 is provided as one input to AND gates 970 and 971, the latter receiving an inverted control signal via inverting amplifier 972. Display intensity data is provided as the second input to AND gate 970 while the output of a 256 bit shift regiater cell 973 is utilized as the second input to AND gate 971. The outputs from both AND gates are provided as inputs to the 256 bit shift register 973 via OR gate 974. The shift register also receives the two clock signals from the clock splitter 905.

In operation, the memory register receives new data only when AND gate 970 is enabled by the write control signal. In the absence of the write control signal, AND gate 971 is enabled and is effective for causing whatever information is stored in the shift register 973 to be recirculated from its output back to its input via line 970. Thus the memory registers recirculate during the period of time when new information is not being placed therein. When the write control line goes high, recirculation ceases and new data is provided via ANd gate 970 to the shift register 973. The data output from the memory register is taken at the input of the shift register 973. It is noted that data can be placed into the memory register only during the proper sequencing of the circuit as controlled by R CLK and the Memory End signals as shown in FIG. 10. However, the output from the memory registers can be obtained at any point in the cycle due to the recirculating of the information stored in the shift register.

Display Board Control Logic Operation

As thus far described, the MSB, B2 and LSB data is received for each color channel and applied to the appropriate set of three memory registers. Prior to the intensity data transmission the address obtained from the MSB data line is applied to address register 901 which determines to which half module memory the data is to be sent. Based on the address register's output, the write controller 904 selects either the upper or lower half module memory registers to receive the incoming data. Further, the write controller selects which of the three phases, A, B or C, the data relates to and enables the correct register for that phase.

The outputs from the memory registers for each color channel are provided to three-driver circuits one of which is shown in FIG. 11 and to be described subsequently. Each driver circuit is for one of the three phases. After data is received for the A phase, the Memory End signal is applied to the write controller for ceasing operation of the A-phase registers and initiating operation of the B-phase registers. Data input continues in this manner until the upper half module is complete and a new address indicator is provided to address register 901.

Driver Circuit

Referring now to FIG. 11, the A-phase driver circuit 950 for the red channel is illustrated. Identical driver circuits are provided for the red channel B and C phases of the display board. Similarly, three-driver circuits are provided for each of the other color channels, one circuit for each phase. The driver circuit 950 receives the red channel A phase display data for both the upper and lower half memory registers. The intensity data is applied to lamp level decoders 951 and 952 respectively. A phase separator 953 is also provided as an input to the lamp level decoders. The phase separator receives level control pulses and a sync pulse from a circuit to be described in connection with FIG. 15. The sync pulse is effective to initialize the separator while the level control pulses cause it to count down through the eight binary codes representing the eight intensity levels, namely, 111 through 000.

Lamp level decoder 951 receives, on lines 925 to 927, the MSB, B2 and LSB data for the red channel upper half module registers of the A-phase (FIG. 9). The lamp level decoder effects a parallel comparison for each bit of the three 12-bit data words against the current code provided from the phase separator 953. Thus the three 12-bit data words enter the lamp level decoder and, as shown in FIG. 11A, are compared bit by bit against the level control value in the separator. In this manner eight comparisons are performed on the three data words, one for each of the eight intensity levels. The result of each comparison is a new 12-bit word composed of zeros where the three bits do not match the level control value and ones where they do. This comparison is repeated for each of the eight binary values. Thus eight new data words are produced as shown in FIG. 11A, one for each level control value. Each data word represents the information for 12 bulbs in one horizontal row of the upper half module display. Specifically, the first word produced by comparing the level control value of 111 against the three A-phase data words will generate the location of bulbs which are to be full on. The second comparison against the level intensity 110 will determine the number of bulbs which are to be illuminated to intensity level 1 and so on, until the comparing process is complete.

The outputs from the lamp level decoders 951 and 952 are provided to 12-bit serial-to-parallel registers 955 and 956 respectively. The serial-to-parallel registers transfer the serial data to parallel and then provide it to a corresponding 12-bit storage and driver register 957 or 958. The D clock signal loads the serial-to-parallel registers. When the serial-to-parallel registers are filled the latch trigger signal loads the registers 957, 958. This double buffing technique permits the serial-to-parallel registers to then receive the next data while the driver registers transmit the previous data to the triacs.

In order to provide the stored information to the circuits which control the operation of the diaplay lamps, a triac address decoder 961 is provided. The triac decoder receives as its input the output from the output counter 900 of FIG. 10 as well as a firing pulse from the output control generator 960 which serves to synchronize operation of the display with the R CLK signal. The triac address decoder 961 decodes the information from the output counter 900 to channel the information to the correct lamp display circuit, as will be explained in connection with FIG. 18. The red channel display circuits receive the information on four calbes 962 through 965. Cables 962 and 963 go to the display circuits for the upper half module while cables 964 and 965 go to circuits for the lower half module. It will be apparent that a greater or lesser number of cables may be utilized, it being merely a matter of design choice in view of the large size of the display. The use of multiple cables permits more efficient physical location of the wiring conduits, etc. and other considerations of design choice.

Triac Display Circuits

Figure 13:
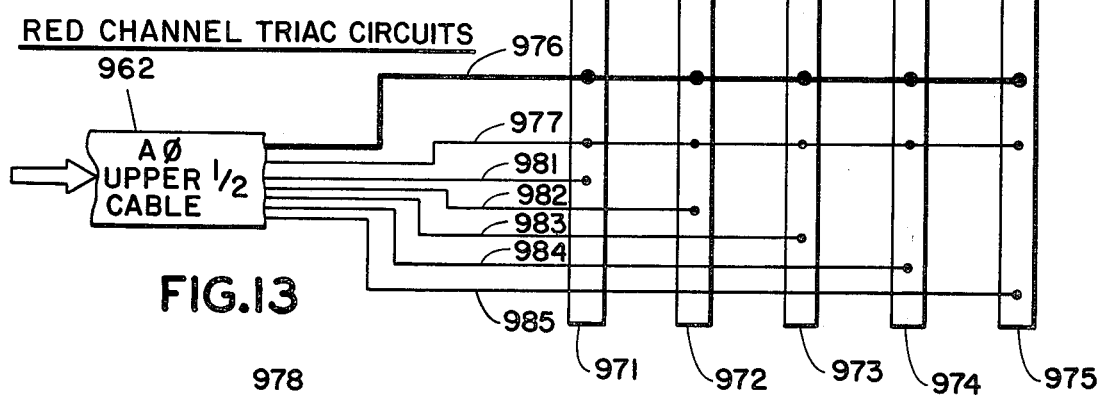
FIG. 13 is a block diagram of the manner of connecting the triac circuits to the driver circuits.
Figure 18:
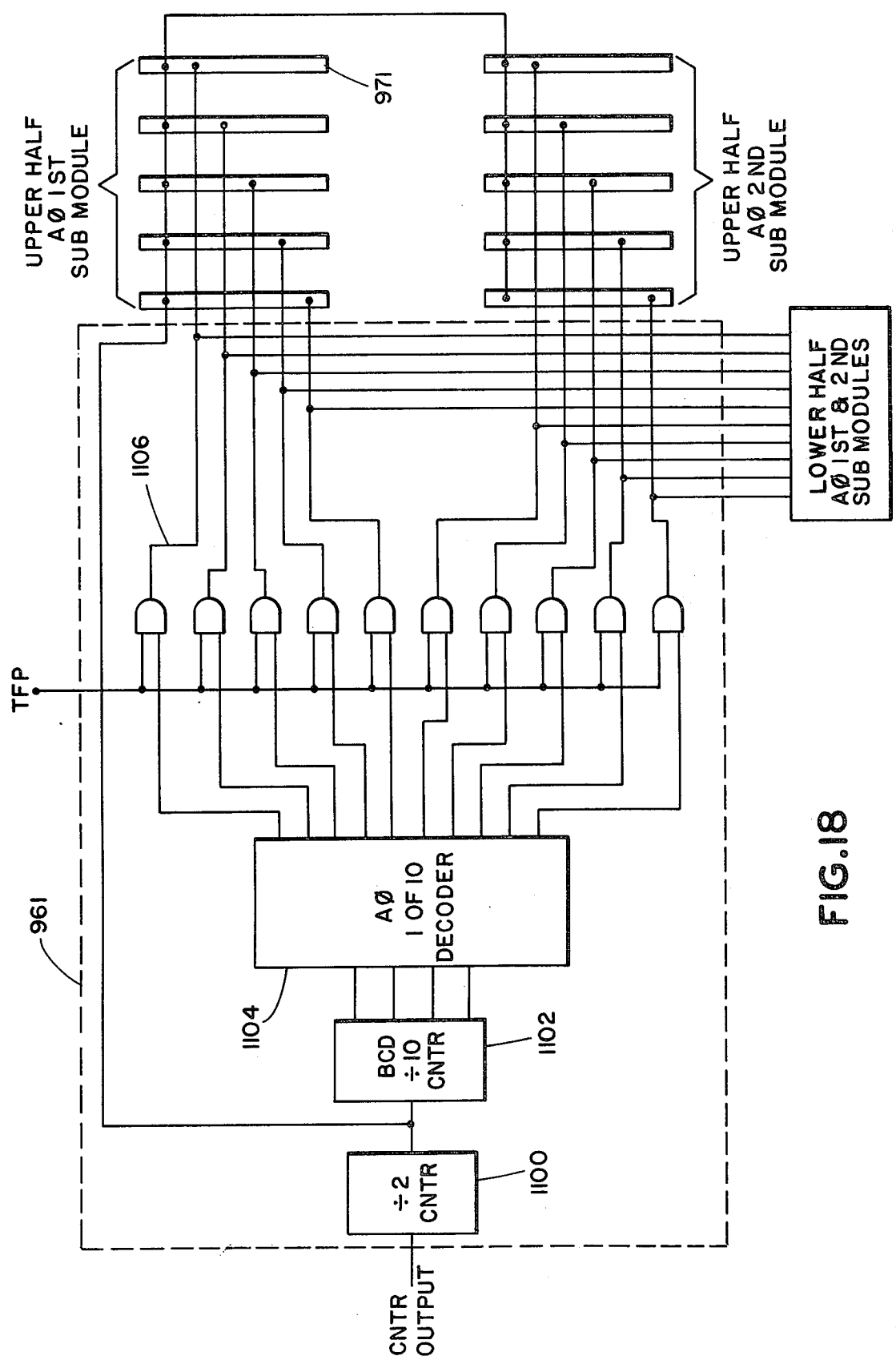
FIG. 18 is a schematic diagram of the triac decoder circuit.

Referring now to FIG. 13, the triac display circuits for illuminating the display lamps are illustrated. The lamp data from each cable 962 through 965 is applied through a matrix connection system to each of five triac circuit boards. For example, cable 962, one of the two cables for the A-phase upper half modules, is illustrated as being connected to triac circuit boards 971 through 975. Each of the cables 962 through 965 carries a total of 18 lines as will now be explained. The five cards 971 through 975 are connected to 12 data lines illustrated, however, as a single line 976. These lines convey the stored information in parallel from the 12-bit storage and driver register 957. Additionally, a single line 977 is effective for selecting either of two groups of 12 triac circuits located on each triac board. This signal is provided from the Triac Address Decoder 961 (FIG. 18).

Figure 14:
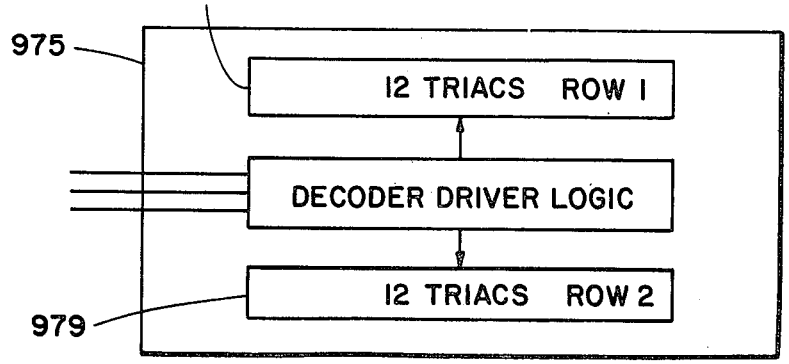
FIG. 14 is a block diagram of the arrangement of the triac circuits on each triac card illustrated in FIG. 13.

As shown in FIG. 14, each board has 24 triacs divided into two groups 978 and 979. The top twelve triacs illuminate the top horizontal row of 12 red lamps with one triac being effective for illuminating each lamp. The bottom 12 triacs 979 illuminate the second horizontal row of red lamps. It thus will be apparent that using five triac cards, a total of 10 rows, can be illuminated from each of cables 962 through 965. Thus, the embodiment illustrated is capable of using four cables each having five triac cards attached thereto for illuminating a complete phase of each color channel. Forty-eight cables and 240 triac boards are necessary for a three-phase four color display module 20 lamp clusters high by 72 lamp clusters long. The lines 981 through 985 are selectively attached to only one of the five triac boards 971 through 975. These lines select the particular triac board to receive the intensity data.

The operation of the phase driver circuit and the triac circuit will be briefly summarized. When the lamp intensity data is supplied to the lamp level decoders (FIG. 11), this information is successively compared against the eight level control values to obtain the number and location of lamps in each row which are to be illuminated to each of the eight intensity levels. This information is then provided to the triac board via a serial-to-parallel register and a storage and driver register. The particular triac card to which the information belongs is selected by the triac address decoder 961, as will be explained. The triac address decoder also selects the correct group of 12 triacs on each card. The lamp intensity information is then utilized to fire the 12 selected triacs controlling the lamps which are to be lit. The triacs are fired at different points of the electric power cycle depending on when the intensity data arrives, as will be described in connection with FIG. 16. This produces the required intensity level variation.

Sync and Level Control Generator

Figure 15:
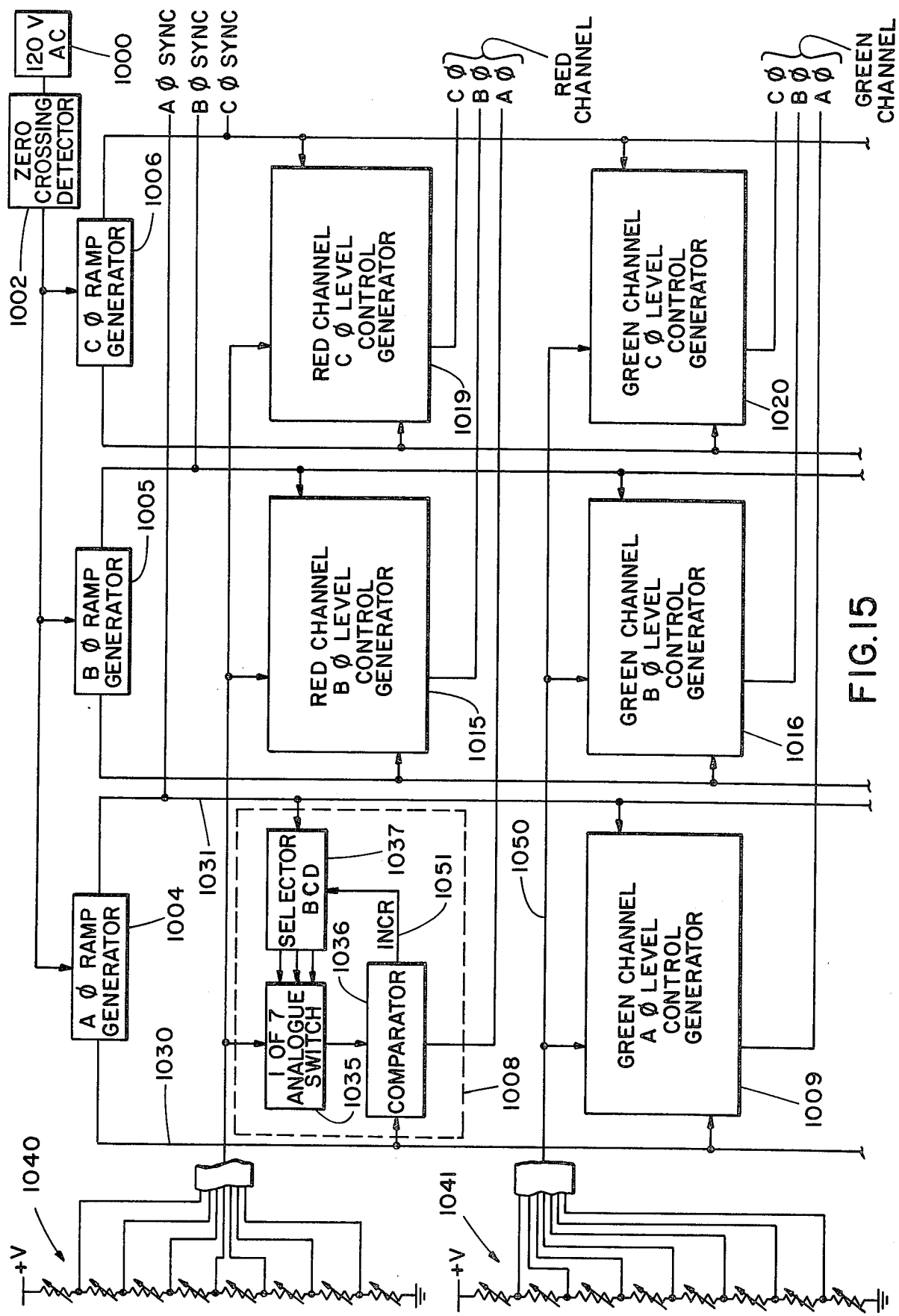
FIGS. 15 and 15A are schematic diagrams of the circuit for generating the phase synchronization and level control pulses for the phase separators of each color channel.
Figure 15A:
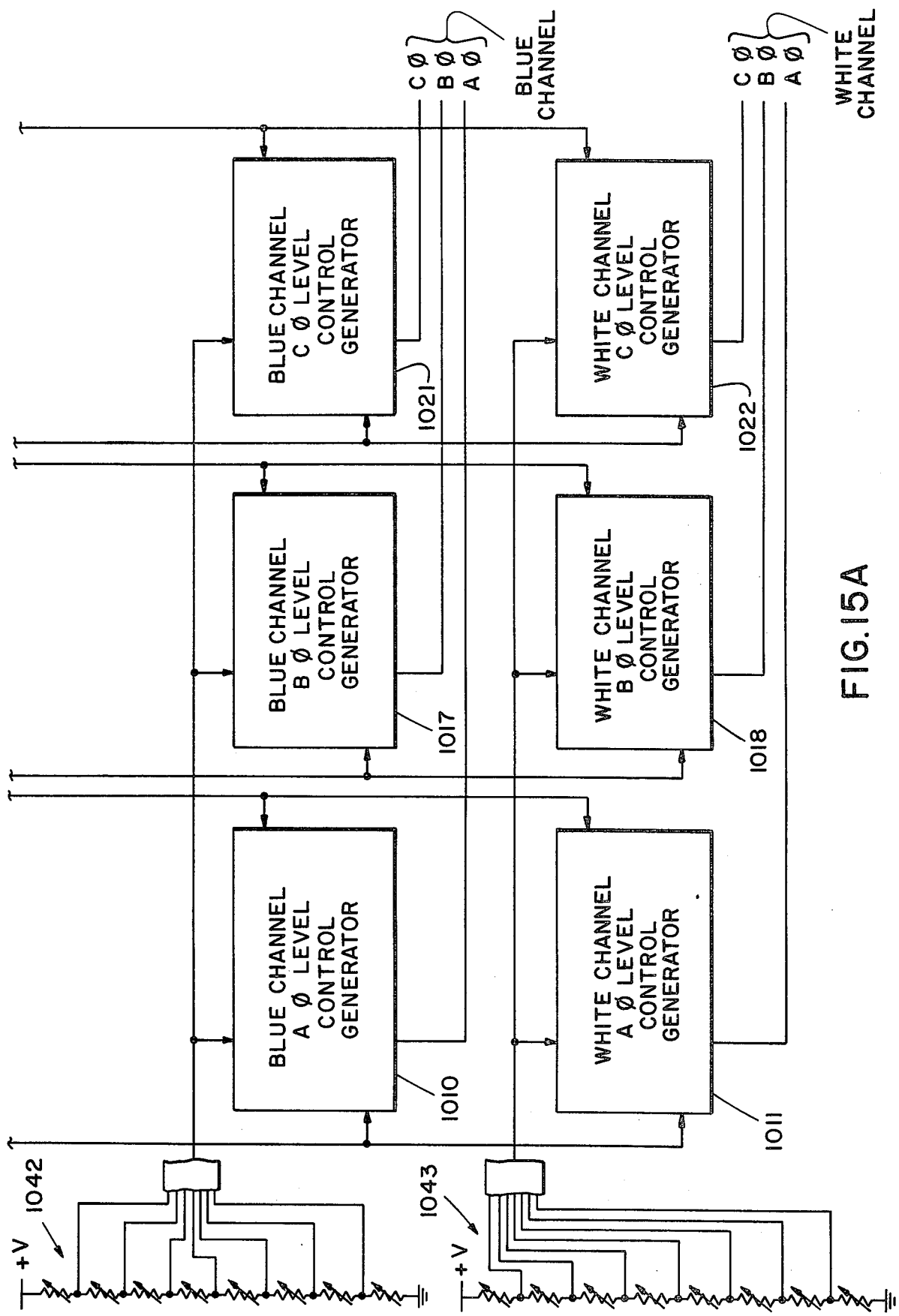

Referring now to FIGS. 15 and 15A, the circuit for producing the sync and level control signals utilized by the phase separator 953 is shown. A 120 volt A.C. 60 hertz 1-phase power source 1000 is provided as an input to a zero crossing detector 1002 which detects the zero crossing of the 60-hertz power line. Based on the pulse outputs from 1002, the three phases corresponding to the 3-phase power supply utilized to illuminate the scoreboard are produced by the ramp generators 1004 through 1006.

Each of the three phases is separated from the preceding and following phase by 60°. For a 60-hertz signal, this represents approximately 2.78 milliseconds with approximately 8.3 milliseconds between zero crossings for each phase (see FIG. 16). The output of the generators is the sync pulse applied, for each phase, to its corresponding driver circuit, as shown in FIG. 11, for resetting the phase separator 953.

When a sync pulse is applied to the phase separator 953 it is reset to 111 the level control value in preparation for beginning a new decoding cycle. The actual decoding, however, does not begin until the level control signal is applied to the phase separator 953. The level control signal is desirably produced in the manner now to be described.

Connected to receive the output of the A-phase ramp generator 1004 are four A-phase level control generators 1008–1011. The level control generators are of identical construction, one each being provided for the red, green, blue and white color channels of the A-phase. Similarly, eight more level control generators 1015–1022 are provided for each color channel of the B and C phases.

Considering now the operation of the A-phase level control generators and in particular, generator 1008, it will be seen that the ramp generator 1004 provides an output on lines 1030 and 1031, both of which are applied to the level control generators 1008–1011.

As indicated for generator 1008, each generator comprises an analogue switch 1035, a comparator 1036, and a binary coded decimal (BCD) selector 1037. The analogue switch 1035 receives seven input lines from a resistor string 1040 connected between a positive source of voltage and ground. Similar resistor strings 1041–1043 are provided for each of the three remaining color channels. The seven inputs to the analogue switch 1035 are each connected at a different point on the resistor string so that a different voltage is presented by each input. The analogue switch 1035 is effective for switching any one of these threshold voltages into the comparator 1036 under the control of the BCD selector 1037. Comparator 1036 compares the voltage level provided from the analogue switch against the instantaneous value of the ramp reproduced by the ramp generator 1004. When the value of the ramp becomes less than the value of the threshold voltage, an output pulse is produced on lines 1050 and 1051. The output on line 1051 is effective for incrementing the selector 1037 to cause the analogue switch to index and provide the next lower threshold voltage to the comparator. In this manner, a succession of pulses is produced (see FIG. 16).

Figure 16:
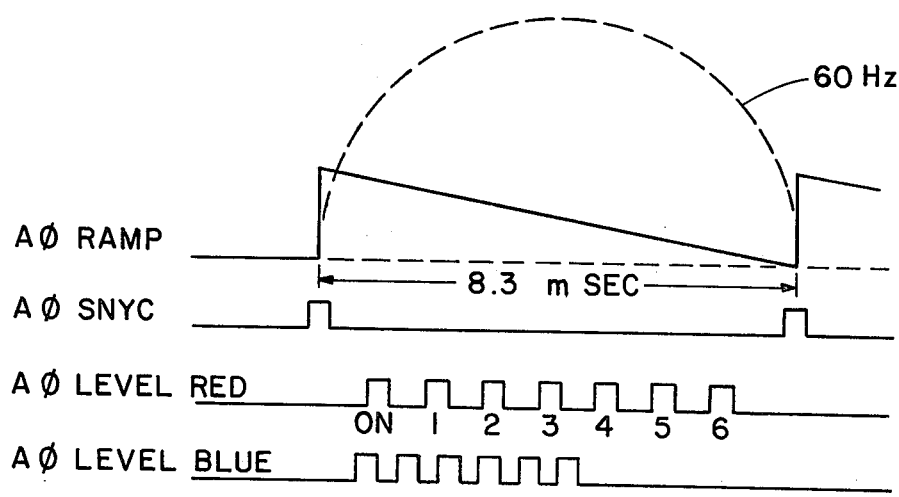
FIG. 16 is a wave form diagram illustrating the interrelationships between the level control pulses, the sync pulses and the ramp signals generated by the circuit of FIGS. 15 and 15A.

The output from the comparator on line 1050 is provided to the phase separator 953 as the level control signal. As illustrated in FIG. 16, for each A-phase ramp generated, an A-phase sync signal is produced by the ramp generator 1004 on line 1031. The seven successive output pulses from the comparator correspond to the ramp voltage falling to the voltage levels set by the variable resistor string 1040. These pulses serve as the A-phase level control signals. The seven pulses are shown in FIG. 16 as approximately equally spaced between the initiation of the A-phase ramp and its termination 8.3 milliseconds later. As will be explained subsequently, this is approximately true only for the white and red signals. The ramp generator output on line 1031 is effective for resetting the BCD selector 1037 at the beginning of each ramp.

Returning to FIG. 15, it will be apparent that by varying the resistance values of the string 1040, the voltage levels applied to the comparator can be adjusted as desired. This is effective for moving the control level pulses to desired positions along the ramp and is used to compensate for color intensity variation.

Referring now to FIG. 17, a diagram illustrating the brightness response of an incandescent bulb on an observer's eye as a function of power is shown for each of the four colors utilized by the present invention. As may be seen, white light has the maximum response from off to full on. By comparison, the red and green incandescent bulbs do not attain as nearly a bright level for the same power level. Most significant, however, is the blue curve. It will be observed that until a blue incandescent bulb is almost fully on, it does not provide a satisfactory level of brightness to an observer. A color display similar to that of color television is assumed to be satisfactory to an observer; that is, the proportionate amounts of red, green and blue light as represented by the C.I.E. tristimulus values will produce a satisfactory colorimetry spectra similar to that of color television phosphors.

Relating the foregoing brightness versus power discussion to the setting of the level control pulses for each color channel, it will be apparent that the resistor strings 1040–1043 are set to compensate for the brightness characteristics of the particular color channel to which they correspond. Thus for the blue channel, as illustrated in FIG. 16, the level control pulses are very closely spaced and begin near the start of the A-phase ramp. This causes the blue lights to turn on sooner in the cycle than the remaining lamps and to operate at higher power levels.

This may be understood by recalling that the ramp wave forms are generated at the zero crossings of the local power supply. As each level pulse is applied to the driver circuit it is effective for causing stored intensity data to be decoded and transmitted to the display board triac circuits. Thus the closer the level control pulses occur to the beginning of a half cycle of the power supply, the longer the bulbs controlled by that driver will remain on during that half cycle. This is effective to select the portion of the FIG. 17 curves a particular color channel will operate on. An alternate way of compensating for blue is to use larger wattage blue lamps or to use two blue lamps per cluster.

A white incandescent bulb is provided in each cluster on the display to provide intense illumination for daytime viewing and to provide unsaturated color hues as represented by the three primary colors, red, green and blue, produced by the use of incandescent lamps, as for example, 40-watt bulbs. It should be recognized that a display other than incandescent bulbs can be utilized, if desired, or if the application so requires. For example, a blue fluorescent bulb which has a more efficient power-to-brightness characteristic may be employed if space and cost limitations are overcome. Other variations such as the use of mercury vapor lamps and the like are also possible and contemplated by the present disclosure.

As mentioned previously, when the sync signal is applied to the phase separator 953, it is reset to the binary code 111. When the first level control signal is applied to the phase separator, the lamp level decoder 951 begins a comparison to decode the bulb intensity data. The memory registers which provide the data input to the lamp level decoders are recirculating at a rate controlled by their two-phase clock. This rate is sufficient so that the entire contents of the recirculating register are received and decoded by the lamp level decoder 951 before the generation of the next level control pulse. A preferred clock pulse rate for the memory registers is on the order of two megahertz or higher and this will permit a transfer of the data from the memory registers in approximately 160 to 180 microseconds.

The A-phase level pulses occur in the interval between the zero crossings of the A-phase. Each of the pulses corresponds to the appropriate turn-on time for lamps to be lit to a selected intensity. The first pulse corresponding to the full-on condition is effective to light the lamps that are to be turned on full. In a similar manner, as each of the succeeding pulses is applied and the information decoded, the appropriate lamps corresponding to that lamp intensity are caused to light. The off condition for a lamp is coincident with the zero crossing of the A-phase such that these lamps are not illuminated at all. No level control pulse is required for the off condition and this information is discarded.

Triac Address Decoder

Referring now to FIG. 18, a schematic circuit of the red channel triac address decoder is shown. As previously described, the inputs to the triac address decoder are the counter output and the triac firing pulse (TFP) from the control generator 960. The counter output is the input to a divide-by-2 counter 1100. The output of the divide-by-2 counter is utilized to control which of the two sets of 12 triac circuits on all triac cards are utilized, that is, whether the top 12 circuits or the bottom 12 circuits are energized.

The divide-by-2 output is also provided to a binary coded decimal (BCD) divide-by-10 counter 1102. The output of this counter on the four lines necessary for BCD is provided to decoder 1104. Decoder 1104 is a one-of-10 decoder which sequentially activates its 10 output lines in response to the input signal from the BCD counter 112. As illustrated, each of the 10 outputs from the decoder 1103 is connected to one triac card in the upper one half module and in the lower one half module of the A-phase. It will be recalled that there are four submodules per phase per module, two in the upper half module and two in the lower half module.

By way of example, when the decoder 1104 energizes line 1106, triac card 971 in the upper one half module and a corresponding triac card in the lower one half module are selected. The intensity data applied via the cable from the driver circuit is then effective for operating the appropriate group of 12 triacs on the selected cards when the TFP signal enables the appropriate AND gate.

Since the entire A-phase runs in synchronism by timing from the R CLK signal, it is possible to achieve this economy of operation wherein both halves of a module are enabled simultaneously for parallel data reception. In a similar manner successive triac cards are enabled by each of the remaining nine outputs from the one-of-10 decoder 1104.

While the embodiment described is a three-phase system, that is, the board is illuminated in three parts, the A-phase, the B-phase, and the C-phase, the present invention is capable of operation on a single phase as disclosed. Further, the system is adaptable to process more than eight intensity levels should that be desired. The technique involved would be to add additional components identical to those disclosed herein to accommodate and process a four-bit binary code which could produce up to 16 intensity levels. Additional memory capacity and faster data processing rates are also required.

While we have shown and described an embodiment of this invention in some detail, it will be understood that this description and illustration are offered merely by way of example, and that the invention is to be limited in scope only by the appended claims.

We claim:
1. A system capable of at least eight levels of light intensity for displaying color images on a plurality of visual display devices forming a cluster operated by application of a periodic power waveform, said cluster display devices arranged in modules to form a full display matrix comprising:
   a. a source of video color signals;
   b. a video to digital signal converter producing digital signals therefrom;
   c. means for storing said digital signals; in matrix form;
   d. means for extracting the digital signals from said storage means;
   e. means for transmitting the extracted signals to said display devices;
   f. means for decoding the extracted signals only during selected intervals on said power waveform to obtain color intensity level information for initiating operation of selected ones of said display devices at each interval, each of said selected intervals corresponding to a display device turn on point for a different level of light intensity; and
   g. means for applying the intensity level information to predetermined ones of the display devices.

2. The apparatus according to claim 1 wherein the means for storing the digital signals are digital computers, said computers storing digital signals for a full display matrix.

3. The apparatus according to claim 1 wherein the means for storing the digital signals are random access memories, said random access memories storing digital signals for a full display matrix.

4. The apparatus according to claim 1 wherein the system is a four color system and said converter produces four discrete digital color signals from said video signal.

5. The apparatus according to claim 1 wherein the means for extracting the digital signals includes:
   a. means for controlling the sequence of data extraction; and
   b. means for addressing said storage means to obtain the stored digital signals and an address yielding the proper display location for the stored digital signals.

6. The apparatus according to claim 5 wherein the means for extracting further includes:
   register means for receiving the extracted signals.

7. The apparatus according to claim 5 wherein said means for decoding includes:
   a. a plurality of recirculating memory registers selectively receiving the extracted signals and producing a repetitive output of the extracted signals; and
   b. means for selecting which memory registers receive the extracted signals according to the address associated with the extracted signals.

8. The apparatus according to claim 1 wherein the means for transmitting the extracted signals includes:
   a. parallel-to-serial register means receiving the extracted data in parallel from said extraction means and transmitting it serially to said decoding means; and
   b. means for controlling the sending and receiving sequence of said registers.

9. The apparatus of claim 8 wherein said register means includes pairs of parallel-to-serial registers and operates in a double buffered relation wherein the registers of each pair alternate receiving and transmitting data.

10. The apparatus according to claim 1 wherein said means for decoding includes:
    a. a plurality of recirculating memory registers selectively receiving the extracted signals and repetitively producing the extracted signals at their output; and
    b. means for selecting which memory registers receive the extracted signals.

11. The apparatus according to claim 10 wherein said decoding means further includes means for determining the display devices to which the extracted signals are applied.

12. The apparatus of claim 10 wherein said means for decoding further includes:
    a. means for sequentially producing binary codes each representative of one level of light intensity; and
    b. means for repetitively comparing each binary code so produced against the output from said recirculating memory registers to obtain said intensity level information.

13. The apparatus of claim 10 wherein said means for selecting includes:
    a. an address register receiving the address corresponding to said extracted signals and selecting the group of memory registers for a corresponding portion of said modules; and
    b. a write controller for determining which memory register in the selected group is to receive the extracted data.

14. The apparatus of claim 1 wherein said means for applying the intensity level information includes:
    a. serial-to-parallel registers receiving the information from the decoding means; and
    b. active circuit means receiving the information in parallel from said serial-to-parallel registers and causing illumination of each of said visual display devices to an intensity level corresponding to the intensity level information for that device.

15. The apparatus of claim 14 wherein said active circuit means includes:
    a. a plurality of triacs, arranged in a configuration corresponding to the display device arrangement in said modules, one of said triacs being employed to control one of said display devices; and
    b. means for selecting the triacs to which the intensity level information is applied.

16. A system capable of at least eight levels of light intensity for displaying color images on a plurality of visual display devices forming a cluster operated by application of a periodic power waveform, said cluster display devices arranged in modules to form a full display matrix comprising:
    a. means for converting a standard color video signal into four separate analogue color signals;
    b. means for converting each color signal from analogue to digital form;
    c. means for storing the digital color signals; in matrix form:
    d. means for extracting the digital color signals from said storage means for display;
    e. means for parallel transmission of the extracted digital signals to said display devices;
    f. means for decoding the trasmitted digital signals only during selected intervals on said power waveform to obtain intensity level information for initiating operation of selected ones of said display devices at each interval, each of said selected intervals corresponding to a display device turn on point for a different level of light intensity; and
    g. means for applying the intensity level information for each color to predetermined ones of said display devices.

17. A system according to claim 16 wherein said means for converting is a color separator which receives a composite color video signal and separates the signal into red, green, blue and Y component signals.

18. A system according to claim 17 wherein said display devices are arranged in clusters of four, each device in said cluster corresponding to a different one of said component signals.

19. A system according to claim 18 wherein said devices are light bulbs and each bulb in a cluster gives off a different color when energized.

* * * * *